United States Patent
Oyama et al.

(10) Patent No.: US 8,004,594 B2
(45) Date of Patent: Aug. 23, 2011

(54) APPARATUS, METHOD, AND PROGRAM FOR CONTROLLING DISPLAY OF MOVING AND STILL IMAGES

(75) Inventors: Koichi Oyama, Tokyo (JP); Tetsuo Morimoto, Kanagawa (JP)

(73) Assignee: Sony Corporation (JP)

( * ) Notice: Subject to any disclaimer, the term of this patent is extended or adjusted under 35 U.S.C. 154(b) by 413 days.

(21) Appl. No.: 12/218,279

(22) Filed: Jul. 14, 2008

(65) Prior Publication Data

US 2009/0021592 A1 Jan. 22, 2009

(30) Foreign Application Priority Data

Jul. 17, 2007 (JP) ................................ P2007-185475

(51) Int. Cl.
*H04N 5/222* (2006.01)
(52) U.S. Cl. ................ 348/333.05; 348/220.1
(58) Field of Classification Search ............... 348/220.1, 348/239, 333.05
See application file for complete search history.

(56) References Cited

U.S. PATENT DOCUMENTS

| | | | | |
|---|---|---|---|---|
| 5,917,488 A | * | 6/1999 | Anderson et al. | 715/838 |
| 6,341,168 B1 | * | 1/2002 | Nagasaka et al. | 348/E5.067 |
| 2001/0008416 A1 | * | 7/2001 | Misawa et al. | 348/207 |
| 2003/0229894 A1 | | 12/2003 | Okada et al. | |
| 2006/0146002 A1 | * | 7/2006 | Nagata | 345/101 |

FOREIGN PATENT DOCUMENTS

| | | |
|---|---|---|
| JP | 2004-072727 A | 3/2004 |
| JP | 2006-165679 A | 6/2006 |
| JP | 2006-325143 A | 11/2006 |
| JP | 2007110224 A | 4/2007 |

OTHER PUBLICATIONS

Office Action from Japanese Application No. 2007-185475, dated May 31, 2011.

* cited by examiner

*Primary Examiner* — Gevell Selby
(74) *Attorney, Agent, or Firm* — Lerner, David, Littenberg, Krumholz & Mentlik, LLP

(57) ABSTRACT

A display control apparatus includes a list-image-display control unit that executes control for displaying a unit moving image list image formed by arranging at least representative images corresponding to respective unit moving image data in a predetermined unit, a representative-image-display control unit that arranges, concerning representative images that should be designated as moving images among the representative images, a moving image obtained by reproducing unit moving image data corresponding thereto on the unit moving image list screen and arranges, concerning the representative images other than the representative images designated as the moving image, a still image represented by a unit moving image corresponding thereto on the unit moving image list image, and a moving-image-change control unit that sequentially changes the representative images designated as a moving image in accordance with a predetermined change rule and change timing.

8 Claims, 14 Drawing Sheets

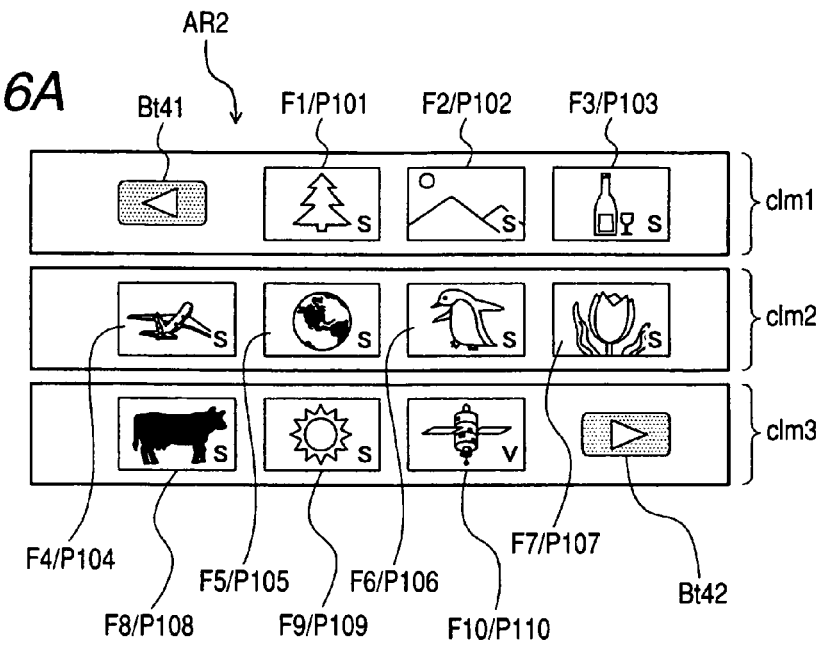
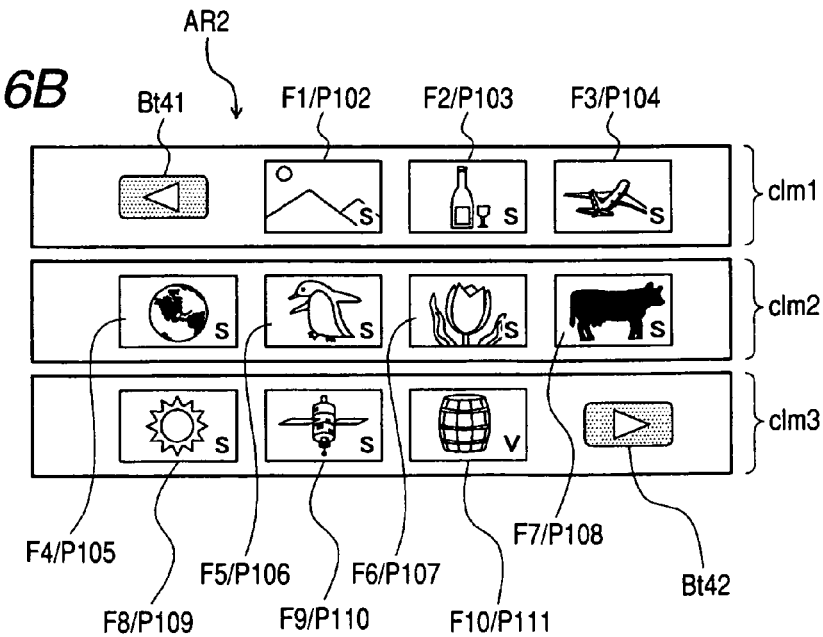

APPARATUS, METHOD, AND PROGRAM FOR CONTROLLING DISPLAY OF MOVING AND STILL IMAGES

CROSS-REFERENCES TO RELATED APPLICATIONS

The present application claims priority from Japanese Patent Application No. JP 2007-185475, filed in the Japanese Patent Office on Jul. 17, 2007, the entire content of which is incorporated herein by reference.

BACKGROUND OF THE INVENTION

1. Field of the Invention

The present invention relates to a display control apparatus that executes display control for outputting to display an image on a display screen of a display device, a method for controlling the display, and a program executed by the display control apparatus.

2. Description of the Related Art

For example, as a method of performing retrieval list display concerning moving image contents stored in a storage medium, a method of arraying and displaying thumbnail images or icons equivalent to title units or chapter units is widely adopted. Usually, such retrieval list display is configured as a GUI (Graphical User Interface) adapted to select a title or a chapter displayed as a thumbnail image or the like to thereby start reproduction from the selected title or chapter.

For example, as an imaging apparatus that is capable of photographing a moving image, there is known an imaging apparatus that creates representative images for respective scenes photographed and recorded so far and displays these representative images on one screen.

The "scene" indicates a unit of moving image contents obtained from the start to the end of moving image recording by the imaging apparatus. The "scene" is also referred to as "cut", "shot", and the like.

However, in the list display of moving image contents described above, usually, only a still image as one thumbnail image corresponding to one frame representing a moving image unit such as one title, chapter, or scene is presented. Therefore, it is difficult for a user to grasp contents of respective scenes. In this regard, it is difficult to say that the list display is easy to use as a method of retrieving moving image contents. In general, recording time length of moving image units such as a title, a chapter, and a scene varies from about several seconds to several tens minutes or several hours. The problem described above is more conspicuous as the moving image units are longer.

Therefore, JP-A-2006-165679 proposes an image reproducing apparatus that reproduces and displays, when a reproduction key is operated to reproduce a thumbnail image of a still image selected according to user operation in retrieval list display such as moving image (title) list display, chapter list display, or the like, a moving image corresponding to the selected thumbnail image in an area of the thumbnail image.

With such an image reproducing apparatus, it is possible to check contents of a moving image (a title) or a chapter in the retrieval list display. Therefore, it is easier to grasp the contents of the title or the chapter than grasping the contents by simply performing list display of only the thumbnail image of the still image.

SUMMARY OF THE INVENTION

Therefore, it is desirable to, first, facilitate a grasp of contents of a unit moving image by, concerning retrieval list display for a certain unit moving image (unit moving image data), displaying the moving image as an image representing the unit moving image. Then, it is desirable to provide a form of retrieval list display that can give higher convenience to a user.

According to an embodiment of the present invention, there is provided a display control apparatus including list-image-display control means for executing control for displaying a unit moving image list image formed by arranging at least representative images corresponding to respective unit moving image data in a predetermined unit, representative-image-display control means for arranging, concerning representative images that should be designated as moving images among the representative images, a moving image obtained by reproducing unit moving image data corresponding thereto on the unit moving image list screen and arranging, concerning the representative images other than the representative images designated as the moving image, a still image represented by a unit moving image corresponding thereto on the unit moving image list image, and moving-image-change control means for sequentially changing the representative images designated as a moving image in accordance with a predetermined change rule and change timing.

With the display control apparatus, it is possible to display not only the still image but also the moving image as the representative images arranged in the unit moving image list image. The representative images displayed as the moving image are sequentially changed in accordance with the predetermined change rule and timing.

According to the embodiment of the present invention, for example, even if a user does not perform in detail operation for selecting representative images, which the user desires to display as a moving image, and reproducing the representative images as a moving image, the representative images displayed as a moving image are automatically changed according to an order and at timing matched to user's sense. Since labor and time for performing operation are reduced in this way, convenience of use for the user is improved. Further, since a display form in which the representative images reproduced as a moving image are automatically changed is obtained, amusement in viewing retrieval list display is also improved.

BRIEF DESCRIPTION OF THE DRAWINGS

FIGS. 6A and 6B are diagrams showing an example of forms concerning reproduction of the index moving image in the embodiment;

DESCRIPTION OF THE PREFERRED EMBODIMENTS

Figure 1:
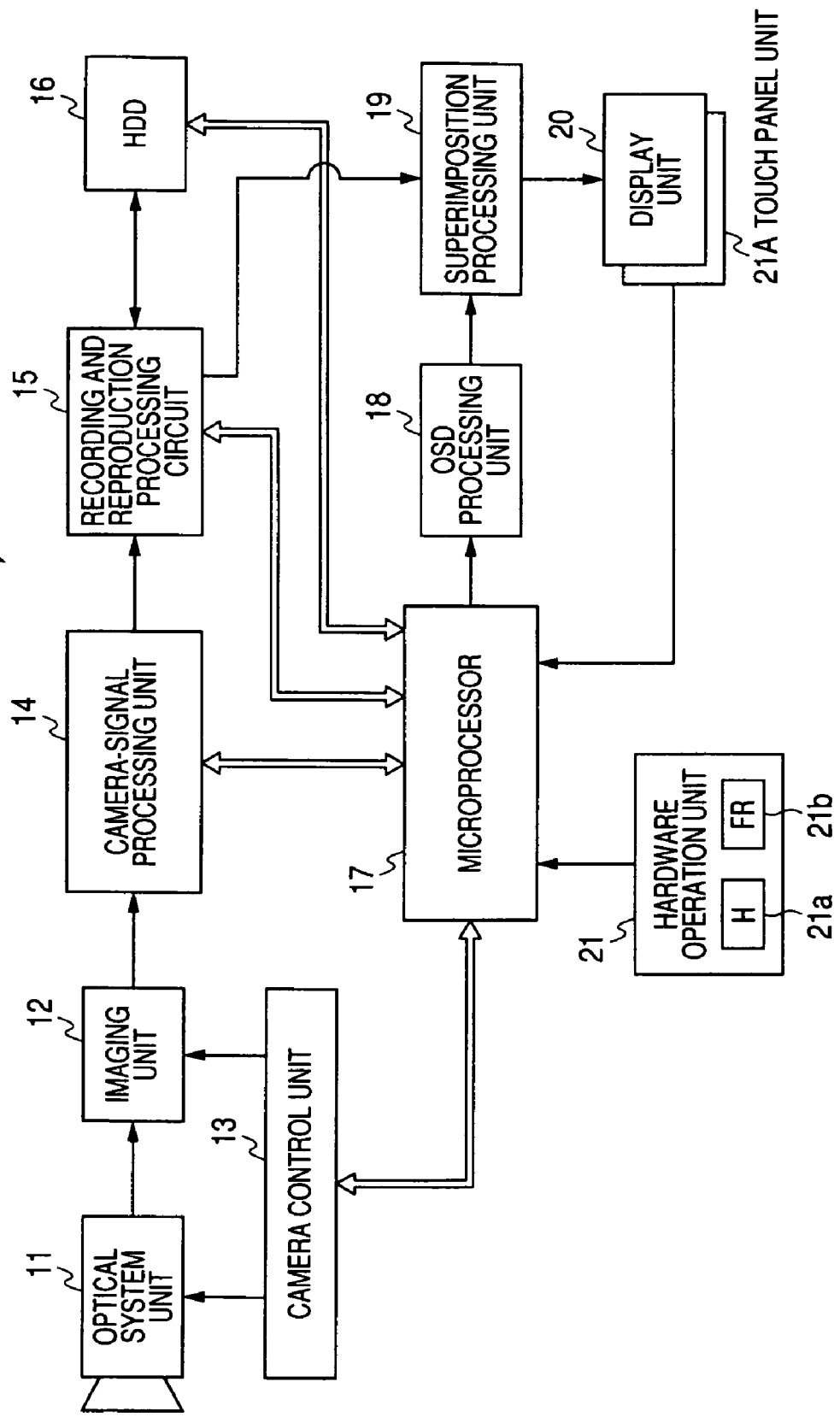
FIG. 1 is a block diagram showing an example of the structure of a video camera apparatus according to an embodiment of the present invention.

FIG. 1 is a block diagram showing an example of the structure of a video camera apparatus 1 that is an apparatus according to an embodiment of the present invention.

In the figure, an optical system unit 11 includes a lens optical system, a focus mechanism, a zoom mechanism, and a stop (iris) mechanism. The optical system unit 11 focuses incident light as imaging light on a light receiving surface of an imaging device (a photoelectric conversion device) included in an imaging unit 12.

A camera control unit 13 performs driving of the focus mechanism, the zoom mechanism, and the stop mechanism in the optical system unit 11 by outputting driving signals to the respective mechanisms according to the control by a microprocessor 17.

The imaging unit 12 includes an imaging device such as a CMOS sensor or a CCD (Charge Coupled Device). The imaging unit 12 performs photoelectric conversion for imaging light received on the light receiving surface as described above. The imaging unit 12 sequentially outputs electric charges, which are accumulated according to the imaging light received on the light receiving surface, at appropriate timing corresponding to a timing signal outputted from the camera control unit 13 according to the control by the microprocessor 17. Consequently, the imaging unit 12 outputs an electric signal corresponding to a picked-up image having a predetermined size of the number of pixels. The signal outputted in this way is inputted to a camera-signal processing unit 14.

The camera-signal processing unit 14 performs waveform shaping such as CDS (Correlated Double Sampling) processing or AGC (Automatic Gain Control) processing for the electric signal inputted from the imaging unit 12 as described above and, then, converts the electric signal into a digital signal and outputs the digital signal to a recording and reproduction processing circuit 15.

The recording and reproduction processing circuit 15 is inputted with the digital signal outputted from the camera-signal processing unit 14 and executes recording signal processing. The recording and reproduction processing circuit 15 generates a recording video signal data corresponding to a predetermined moving image recording format such as compression coding by a predetermined system. The recording and reproduction processing circuit 15 writes and records the video signal data generated in this way in an HDD 16. As a result, data of video contents obtained by imaging is managed to be stored in the HDD 16. A moving image obtained from the start to the end of photographing and recording by the imaging apparatus is also referred to as scene (or cut or shot). The video contents recorded in the HDD 16 as described above are also managed in units of the scene. In other words, in principle, data of the video contents in scene units is managed by a file system as a moving image file of a predetermined format. However, when recording time of one scene is extremely long and exceeds a maximum data amount or maximum time in one moving image file, the data is divided into plural moving image files and the plural moving image files are managed as video contents corresponding to one scene.

The recording and reproduction processing circuit 15 also executes processing for displaying a through image on a display unit 20 during a photographing and recording mode. The through image refers to an image picked up by the optical system unit 11 during the photographing record mode. A user can check photographed image contents by looking at the through image displayed on the display unit 20. For the through display, the recording and reproduction processing circuit 15 generates a video signal for the through image having resolution or the like suitable for image display by the display unit 20 using the digital signal inputted from the camera-signal processing unit 14. The recording and reproduction processing circuit 15 outputs the video signal for the through image via a superimposition processing unit 19 to the display unit 20.

The recording and reproduction processing circuit 15 can read out the data of the video contents stored in the HDD 16 and execute decoding processing corresponding to the recording signal processing to reproduce the video signal as the moving image. The video signal reproduced in this way is outputted to the display unit 20 via the superimposing processing unit 19 according to, for example, the control by the microprocessor 17 to be displayed on the display unit 20 as the image.

As actual video contents, an audio signal that should be reproduced to lip-sync with the video signal is also included together with the video signal. For convenience of simplification of explanation, the recording and reproduction processing for the audio signal are not shown in the figure and explained.

The microprocessor 17 includes a CPU, a ROM, and a RAM. For example, the microprocessor 17 executes a program stored in the ROM to thereby execute various kinds of control in the video camera apparatus 1. Consequently, various operations of the video camera apparatus 1 are obtained.

An OSD (On Screen Display) processing unit 18 and the superimposition processing unit 19 are provided to cause the display unit 20 to display images as various GUIs (Graphical User Interfaces) corresponding to an operation of the video camera apparatus 1 at that point.

When a GUI image should be displayed, the microprocessor 17 causes the OSD (On Screen Display) processing unit 18 to generate display video signal (display image data) having image contents as the GUI image and output the display video signal to the superimposition processing unit 19. The superimposition processing unit 19 outputs the display video signal, which is outputted from the OSD processing unit 18, to the display unit 20. In this case, when the GUI image should be superimposed on, for example, a through image or a reproduced image, the microprocessor 17 superimposes the display video signal of the GUI image over a video signal of a through image, a reproduced image, or the like inputted from the recording and reproduction processing circuit 15, combines the display video signal with the video signal, and outputs the video signal after the combination to the display unit 20.

In the operation unit 21, various operators such as hardware keys and buttons included in a main body of the video camera apparatus 1 and an operation-signal output section for outputting an operation signal corresponding to operation for the operators are collectively shown. For example, as an operator in the operation unit 21, a shutter button operated on taking photographs, an operator for selecting a photographing mode and the like, an operator for performing up and down of parameters, and the like are included. In particular, in this figure, a home key 21a and a film roll key 21b are shown as operators forming the operation unit 21. By operating the home key 21a, it is possible to cause the display unit 20 to display a GUI image as an original menu screen called home menu. By operating the film roll key 21b, it is possible to cause the display unit 20 to display a GUI image as a film roll index screen described later.

The video camera apparatus 1 according to this embodiment includes, besides the keys and the buttons as the operation unit 21, a touch panel 21A as an operation input unit. In practice, the touch panel 21A is provided in a form integrated with a display screen of the display unit 20. In other words, the video camera apparatus 1 according to this embodiment provides a GUI with which operation for, for example, directly touching the screen of the display unit 20 on which a GUI image is displayed can be performed. Depending on contents of the GUI, operation for the GUI image displayed on the display unit 20 may be performed according to operation for a predetermined key or button in the operation unit 21.

As it is seen from the structure described above, in the video camera apparatus 1, it is possible to store video contents obtained by imaging and recording in the HDD 16. The HDD 16 is one of storage media that can easily realize a large capacity in a GB (gigabyte) class technically and in terms of cost under the present situation among random-accessible storage media. Therefore, a large number of video content data mainly including compressed encoded data can be stored in the HDD 16.

Taking into account the fact that a large number of video contents can be stored in this way, when improvement of convenience for a user and the like are demanded, it is preferable to give a list display function concerning the stored video contents as a function of a video camera and improve retrieval properties thereof. Therefore, the video camera apparatus 1 according to this embodiment has a list retrieval display function concerning such video contents as one function of a GUI. In other words, the video camera apparatus 1 displays a GUI image, in which list retrieval can be performed, on the display screen of the display unit 20 with the video contents stored in the HDD 16 as an object. For the random-accessible storage media, in general, it is possible to perform reproduction operation for contents on such a list retrieval screen. In this embodiment, it is also possible to perform reproduction operation for contents on the list retrieval screen.

An example of an operation form related to display of the list retrieval screen in the video camera apparatus 1 according to this embodiment is explained with reference to FIGS. 2A to 2D.

Figure 2:
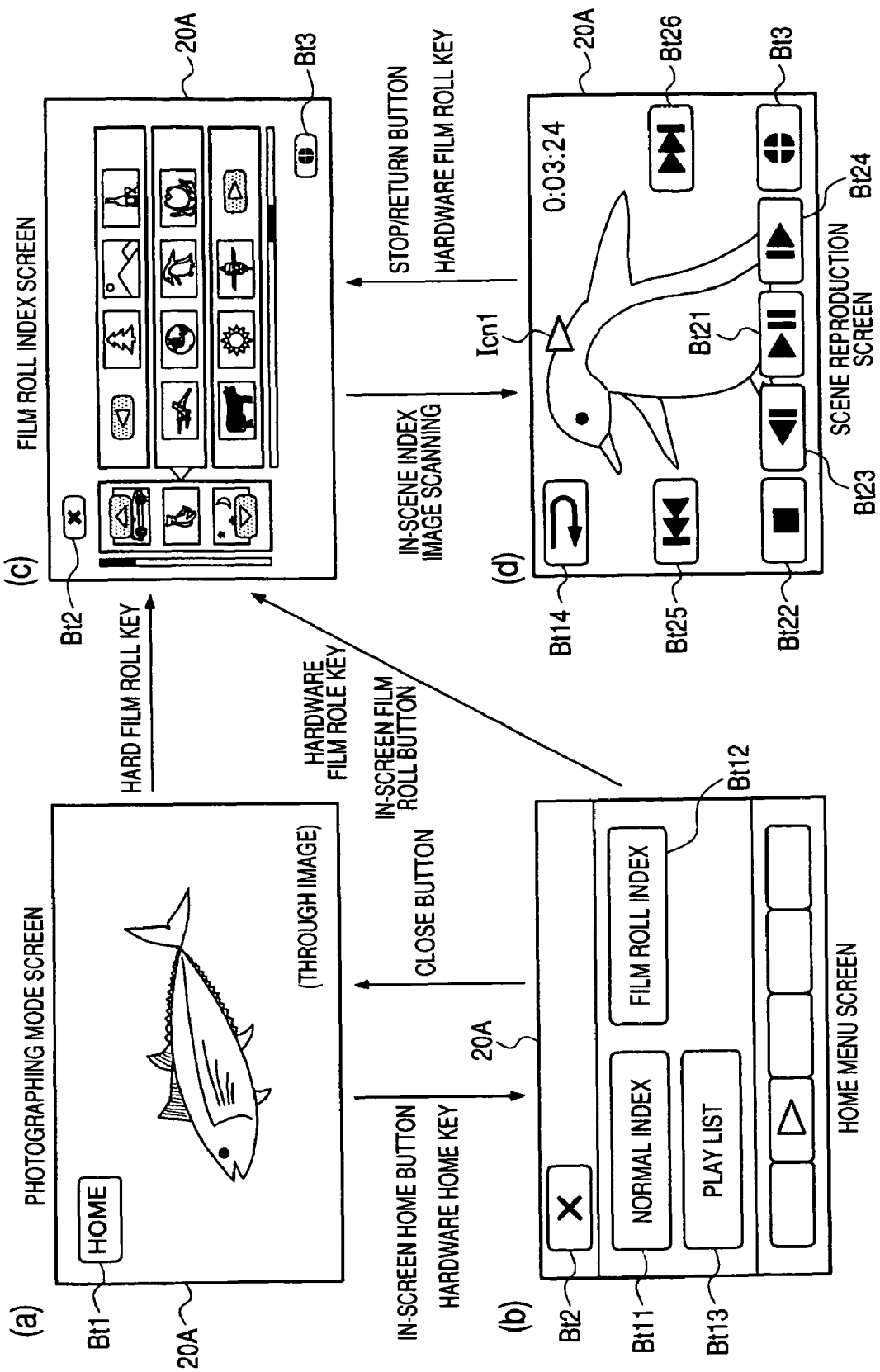
FIGS. 2A to 2D are diagrams showing an example of contents of images displayed on a display screen section according to operation related to display of a list retrieval screen in the video camera apparatus according to the embodiment.

For example, it is assumed that the video camera apparatus 1 according to this embodiment is in a photographing standby mode. Under the photographing standby mode, as shown in FIG. 2A, the video camera apparatus 1 is in a state of standby for photographing and recording start operation while executing an operation for displaying a so-called through image, which is an image photographed by the optical system unit 11 at that point, on a display screen section 20A of the display unit 20. For example, if operation for instructing the start of photographing and recording (photographing start operation) is performed under this state, photographing and recording is started at or after timing of the operation. This photographing and recording is executed until photographing finish operation for instructing the finish of the photographing and recording is performed. For confirmation, as described above, video contents in one unit stored in the HDD 16 according to this embodiment are, in principle, equivalent to a unit of moving image data (file) obtained by photographing and recording corresponding thereto from the photographing start operation to the photographing finish operation. This unit is referred to as scene, cut, shot, or the like concerning video contents. In this embodiment, a name of the unit is uniformly referred to as "scene" in the following explanation.

In an image of the through image displayed by the video camera apparatus 1 according to this embodiment, as shown in FIG. 2A, an in-screen home button Bt1 is displayed. In this case, an image of the in-screen home button B1 is located on the upper left in the display screen section 20A. However, the image of the in-screen home button Bt1 may be displayed in other positions.

The home button Bt1 functions as a button for performing operation for shift to a screen of a home menu. When the user performs operation for touching the display position of the home button Bt1 on the through screen as operation on the touch panel 21A, as indicated as transition from FIG. 2A to FIG. 2B, the display screen section 20A shifts from through screen display performed so far to screen display of the home menu.

As explained with reference to FIG. 1, the home key (a hardware home key) 21a is provided in the main body of the video camera apparatus 1 according to this embodiment as one of the operators of hardware. By operating the home key 21a, as indicated as transmission from FIG. 2A to FIG. 2B, the display screen section 20A can shift from the through screen display performed so far to the screen display of the home menu in the same manner as described above.

The home menu shown in FIG. 2B is an original menu screen among menu screens as GUIs in which touch panel operation is possible. Therefore, by starting operation from the home menu and tracing the menu screens to an appropriate menu screen, the user can perform various kinds of operations for the video camera apparatus 1.

In the screen of the home menu shown in FIG. 2B, a close button Bt2 is displayed as a button image.

When the user performs push operation on a touch panel (touch panel push operation) for the close button Bt2, a home menu screen presently displayed is closed and returned to a screen displayed before the present display of the home menu. In this case, as indicated as transition from FIG. 2B to FIG. 2A, the display is switched to a through screen display under the photographing standby mode.

In the home menu screen, a normal index button Bt11, a film roll index button Bt12, and a play list button Bt13 are further displayed.

When the user performs touch panel push operation for the normal index button Bt11, although not shown in the figure, the display screen section 20A shifts from the home menu screen shown in FIG. 2B to the display of the normal index image. When the user performs touch panel push operation for the film roll index button Bt12, as indicated by shift from FIG. 2B to FIG. 2C, the display screen section 20A shifts to the display of the film roll index screen.

In this embodiment, the film roll key 21b, which is one of the hardware keys, is provided in the main body of the video camera apparatus 1. In this embodiment, switching of the display to the film roll index screen is also performed by operating the film roll key 21b in a state in which some display other than the display of the film roll index screen is performed. As shown in FIGS. 2A to 2D, it is possible to shift from the through screen shown in FIG. 2A, the home menu screen shown in FIG. 2B, or the scene reproduction screen shown in FIG. 2D to the film roll index screen according to operation of the film roll key 21b. Consequently, when display switching to the film roll index screen, which is a characteristic in this embodiment as described later, can be more directly and quickly performed than, for example, when the display switching is performed by touch panel operation.

When operation for the play list button Bt11 is performed, although not shown in the figure, the display is switched to the play list screen in a display screen section 20A. The play list screen is, for example, a screen that presents a play list created by the user concerning the video contents stored in the HDD 16.

The "normal index screen" and the "film roll index screen" referred to in the above explanation are list retrieval screen for video contents that can be displayed in the video camera apparatus 1 according to this embodiment.

Although an example of a display form of the "normal index screen" is not shown in the figure, the "normal index screen" refers to a list retrieval screen of a display form in which the video contents (moving image files) stored in the HDD 16 are presented mainly in video content units. In the "normal index screen", respective thumbnail images correspond to respective video contents (scenes) and the thumbnail images are arrayed and displayed in accordance with sort order set in advance. In other words, a list of scenes is indicated by thumbnail images corresponding to the respective scenes. For example, when the user performs predetermined operation for selecting and determining certain one of the thumbnail images displayed on the normal index screen, the video camera apparatus 1 starts reproduction of video contents to which the selected and determined thumbnail image corresponds.

On the other hand, as explained in detail later, in the "film roll index screen" shown in FIG. 2C, concerning one video content selected out of the video contents stored in the HDD 16, contents in a scene of the one video content are indicated by an array of thumbnail images having image contents extracted from certain timing according to the elapse of reproduction time. The name of "film roll" in the film roll index screen is derived from the fact that, when one scene is grasped as one film roll, the display form of the thumbnail image is just like an image obtained by expanding the film roll and looking at contents of frames.

When predetermined operation for selecting and determining one thumbnail image out of the thumbnail images displayed in the film roll index screen is performed, the video camera apparatus 1 starts reproduction of the video content from reproduction time corresponding to the selected and determined thumbnail image. In other words, the video camera apparatus 1 can start reproduction from a halfway position in one video content.

According to the above description, thumbnail images (representative images) arrayed in the list retrieval screen as the "normal index screen" and the "film roll index screen" can be grasped as indexes or headings corresponding to a unit of video contents recorded in the HDD 16 in the former screen and can be grasped as indexes or headings corresponding to respective reproduction times and positions set between start time and finish time for one video content (one scene) in the latter screen. The name "index screen" in the entire names of the two list retrieval screen is derived from the fact that the screens are screens that present indexes or headings. In the following explanation, thumbnail images (representative images) that function as respective indexes or headings on an index screen are also referred to as index images.

An example of a display form and an example of a functional operation of the film roll index screen displayed in the display screen section 20A are explained with reference to FIG. 3. In the film roll index screen shown in FIG. 3, for example, the contents shown in FIG. 2C are enlarged.

An area in the film roll index screen roughly includes a scene unit index area AR1 and an in-scene index area AR2.

In the scene unit index area AR1, index images (thumbnail images: still images) corresponding to video content (scene) units stored in the HDD 16 are displayed to be arrayed in accordance with predetermined sort order along the vertical direction. In this case, in the scene unit index area AR1, three scene unit index images (P1, P2, and P3) are displayed. The scene unit index image P2 located in the center indicates a selected scene (video content). When a scene unit index image, i.e., video content (a scene) that should be selected (should be located in the center) is changed to other images, touch panel push operation is appropriately applied to a forward button Bt31 and a return button Bt32. Every time the operation on the forward button Bt31 and the return button Bt32 is performed, the scene unit indexes are scrolled one by one in an upward direction or a downward direction. According to the scroll, the scene unit index image located in the center is switched. In the scene unit index area AR1, a scroll bar Br1 is displayed along the left side of the area in which the scene unit index images are arrayed. A position of a knob in the scroll bar Br1 indicates in which order in all the scene unit index images the scene unit index image displayed in the scene unit index area AR1 is at present. By performing drag operation on a touch panel for the knob along the scroll bar Br1, it is possible to scroll the scene unit index image by a unit movement amount larger than a unit movement amount in operating the forward button Bt31 and the return button Bt32.

In the in-scene index area AR2, contents of a scene (video content) corresponding to the scene selected in the scene unit index area AR1 (the selected scene), i.e., the scene unit index image P2 arranged in the center in the scene unit index area AR1 are displayed as described below.

In the in-scene index area AR2 in this case, the in-scene index area AR2 is divided into three row areas clm1, clm2, and clm3. Then, first, index image attaching areas F1, F2, and F3 are arranged in order from the left to the right in the row area clm1, index image attaching areas F4, F5, F6, and F7 are arranged in order from the left to the right in the next row area clm2, and index image attaching areas F8, F9, and F10 are arranged in order from the left to the right in the next row area clm3. These index image attaching areas F1 to F10 are areas in which in-scene index images are displayed as if the in-scene index images are attached. Arraying order of the index image attaching areas F1 to F10 corresponds to progress of reproduction time of a selected scene (elapse of reproduction time: in time series).

In this case, in-scene index images P101 to P110 are attached to and displayed in the index image attaching areas F1 to F10, respectively. The in-scene index images P101 to P110 are thumbnail images created by extracting image contents, which are displayed at predetermined time intervals according to the progress of the reproduction time of the selected scene, from the selected scene. Since the index image attaching areas F1 to F10 correspond to the progress of the reproduction time of the selected scene as described above, the in-scene index images P101 to P110 are displayed according to the progress of the reproduction time of the selected scene in this order.

In the following explanation, the index image attaching areas F1 to F10 are also referred to as first index image attaching area F1 to tenth index image attaching area F10 according to the arraying order.

On the left side of the first index image attaching area F1 in the row area clm1, a forward button Bt41 is arranged. On the right side of the tenth index image attaching area F10 in the row area clm3, a return button Bt42 is arranged. Depending on time length of a scene, as an index image displayed in the in-scene index area AR2, usually, an index image obtained in a reproduction section in a part of an in-scene index image obtained in the scene is displayed. By applying touch panel push operation to the forward button Bt41 and the return button Bt42, it is possible to put scene reproduction time forward or put the scene reproduction time back to perform scroll in such a manner as to forward or return the in-scene index images attached to and displayed in the index image attaching areas F1 to F10 one by one.

In a lower side of the in-scene index area AR2, a scroll bar Br2 extending in the horizontal direction is arranged. By dragging a knob of the scroll bar Br2, it is possible to forward and return the in-scene index images attached to and displayed in the index image attaching areas F1 to F10 by a unit movement amount larger than a unit movement amount in operating the forward button Bt31 and the return button Bt 32.

As it is understood from the above explanation, in the in-scene index area AR2, in-scene index images having image contents corresponding to a certain scene in a selected scene are arrayed and displayed according to time series of scene contents. The user can easily grasp image contents in the selected scene by looking at this display.

In the film roll index screen, the close button Bt2 and a related function button Bt3 are arranged.

When touch panel push operation for the close button Bt2 is performed, display on a film roll index screen is deleted to return the film roll index screen to a state before display. For example, if the home menu screen is switched to the present display of the film roll index screen, the film roll index screen is returned to the home menu screen.

The related function button Bt3 is a button for performing operation for jump to a setting item, a menu screen, or the like related to a screen displayed at that point. When the related function button Bt3 is operated while the film roll index screen is displayed, for example, as described later with reference to FIGS. 9A to 9C, the film roll index screen shifts to an operation screen (a related menu screen) for performing setting for a predetermined item related to the film roll index screen.

For example, when the user performs touch panel push operation (selection and determination operation) for one of the in-scene index images displayed in the in-scene index area AR2, the video camera apparatus 1 starts halfway reproduction of the selected scene from reproduction time corresponding to an in-scene index image designated by the present selection and determination operation. According to the start of the halfway reproduction, in the display screen section 20A, as indicated as transition from FIG. 2C to FIG. 2D, the film roll index screen is switched to the scene reproduction screen with image contents for reproducing and displaying the selected scene. For confirmation, when the film roll index screen is switched to the reproduction screen shown in FIG. 2D, reproduction and display is started from an image with contents same as contents of the in-scene index image designated by the present selection and determination operation.

On the scene reproduction screen shown in FIG. 2D, as software buttons, a return button Bt14, a scene unit forward button Bt25, a scene unit return button Bt26, a reproduction start/pause button Bt21, a stop button Bt22, a fast forward button Bt23, a fast return button Bt24, and the related function button Bt3 are displayed. The user can reproduce a scene (video content) as intended by the user by performing touch panel push operation for the scene unit forward button Bt24, the scene unit return button Bt26, the reproduction start/pause button Bt21, the stop button Bt22, the fast forward button Bt23, and the fast return button Bt24.

When the user operates the return button Bt14, the scene reproduction screen is returned to a screen displayed before the scene reproduction screen shifts to display of the present scene reproduction screen. As explained above, when the film roll index screen shown in FIG. 2C is switched to the scene reproduction screen, the scene reproduction screen is returned to the film roll index screen.

When the user performs operation for the related function button Bt3 arranged and displayed on the scene reproduction screen, although not shown in the figure, the scene reproduction screen shifts to an operation screen on which a predetermined setting item, a menu, and the like related to scene reproduction are displayed.

As described above, the video camera apparatus 1 according to this embodiment can display the film roll index screen as an index screen in the display screen section 20A besides the through screen, the menu screen, the scene reproduction screen, and the like.

In the film roll index screen, as explained above with reference to FIG. 3, the in-scene index images extracted from the selected scene are attached to and displayed in the first to tenth index image attaching areas F1 to F10 according to time series. The in-scene index images in this embodiment are basically still images extracted from certain reproduction time in the selected scene. Therefore, a method of determining timing for extracting the in-scene index images as still images from the selected scene is explained with reference to FIGS. 4A to 4C.

Figure 4:
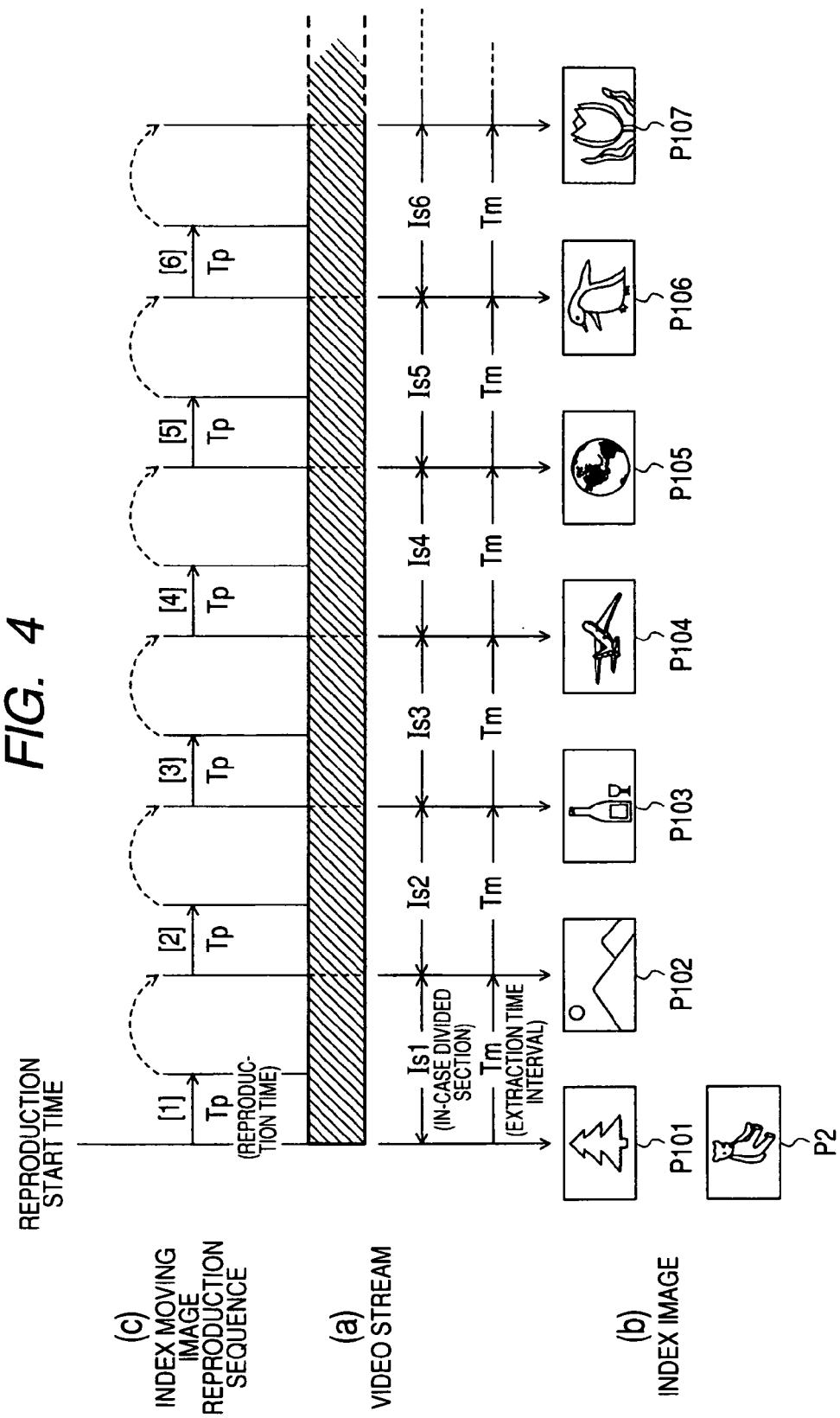
FIGS. 4A to 4C are diagrams for explaining an example of setting of extraction time intervals for an index image in a scene and an example of setting of a reproduction sequence for the index image.

In FIG. 4A, stream data of a moving image as a selected scene (a video stream) is schematically shown in a bar format according to the elapse of reproduction time. A left end of the bar as the video stream is reproduction start time of video content as the selected scene. The bar extending in the right direction represents the elapse of reproduction time.

Figure 3:
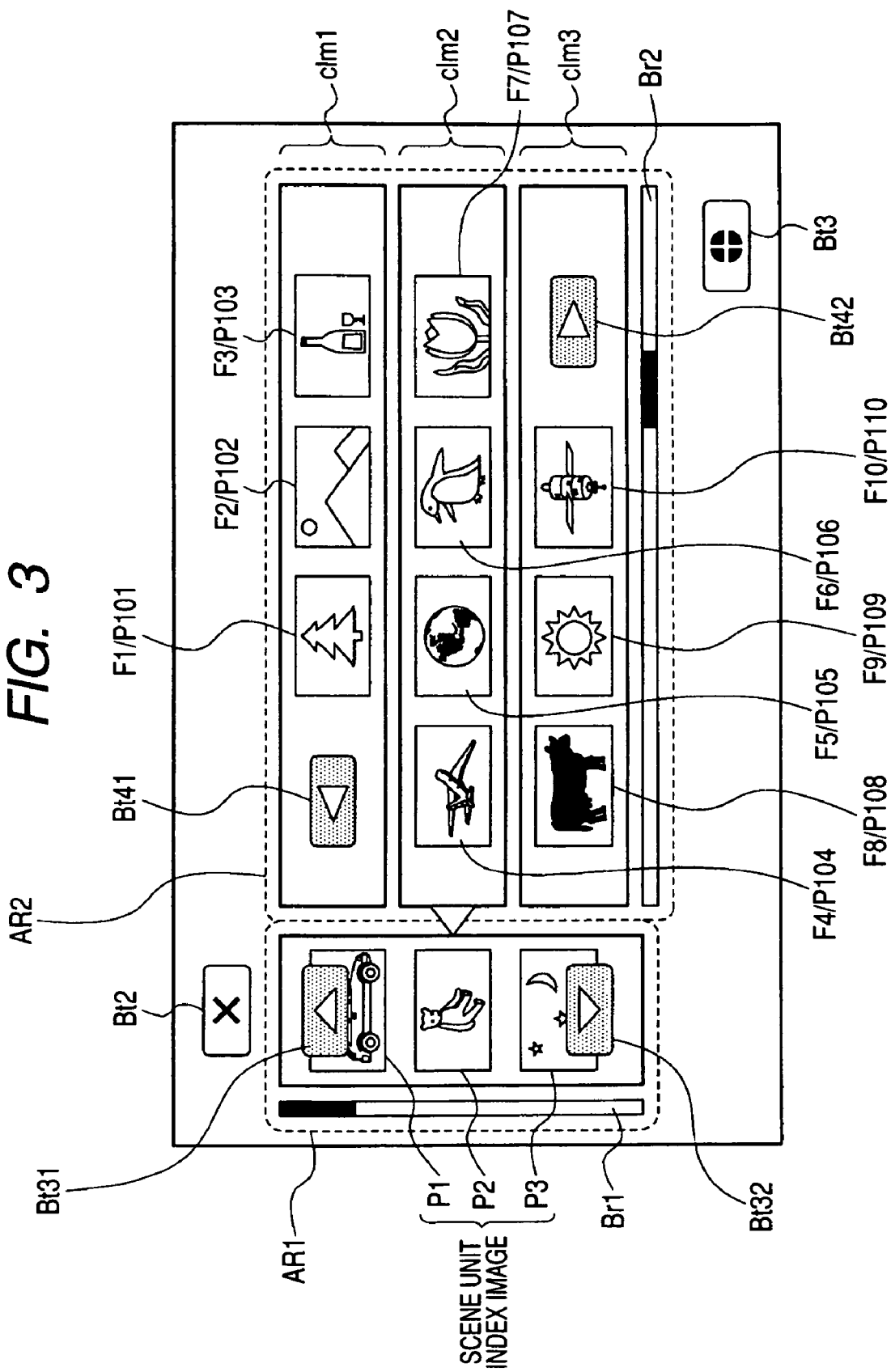
FIG. 3 is a diagram showing an example of display contents of a film roll index screen according to the embodiment.

In FIG. 4B, the in-scene index images P101 to P110 displayed in the first to tenth index image attaching areas F1 to F10 in FIG. 3 are shown in association with reproduction timing extracted from the video stream.

FIG. 4C schematically shows a reproduction sequence in reproducing a moving image as in-scene index images. This is described later.

In this case, first, at a point t0 that is the reproduction start time of the selected scene, still image content corresponding to a leading frame of the video stream is extracted and created as the first in-scene index image P101. The scene unit index image arranged in the scene unit index area AR1 is also created from a leading frame image of a video stream of a scene corresponding thereto. In FIG. 4B, the scene unit index image P2 is also created together with the in-scene index image P101 at the reproduction start time.

In this embodiment, an extraction time interval Tm is set in advance. Consequently, as shown in the figure, reproduction time (extraction and reproduction time) when the second in-scene index image P102 following the in-scene index image P101 should be extracted is a point when the extraction time interval Tm elapses from the point t0. After this, in the same manner, each point when the extraction time interval Tm elapses is determined as reproduction time when the in-scene index images P103 to P110 should be extracted. In the figure, because of a size of a drawing, only the in-scene index images P101 to P107 are shown.

The method of determining reproduction time (extraction and reproduction time) when the in-scene index image should be extracted explained with reference to FIGS. 4A and 4B is a most proper and simplest example. The extraction and reproduction time may be determined according to rules other than this.

When the extraction and reproduction time of the in-scene index image is determined as described above, it can be said that each of the in-scene index images P101 and P102 indicates image content at the top in in-scene divided sections Is1, Is2, and the like that are sectional portions (partial moving image data) of the video stream of the selected scene obtained by dividing the video stream at each extraction time interval Tm. In other words, it can be said that the in-scene index images are representative images corresponding to the in-scene divided sections.

As described so far, each of the in-scene index images arrayed and displayed in the film roll index screen according to this embodiment is basically a still image. However, considering the fact that the in-scene divided sections are a moving image having certain reproduction time length, in the in-scene index image, the beginning of an in-scene divided section corresponding to which is indicated by a still image, it is anticipated that it may be difficult for the user to grasp contents of the in-scene divided section. For example, similar scenes are photographed continuously in-scene divided sections, in-scene index images in the in-scene divided sections have similar contents. Therefore, it is difficult for the user to distinguish the in-scene index images.

Therefore, in this embodiment, the in-scene index images are displayed as a moving image in the film roll index screen to allow the user to accurately grasp contents of the in-scene index sections of the in-scene index images. Moreover, in displaying the in-scene index images as a moving image, a form not used in the past is given to the moving image to improve convenience for the user. This point is explained below.

For example, as explained with reference to FIGS. 2A to 2D above, it is assumed that, during the photographing mode or during display of the home menu screen, when the user performs the predetermined operation for displaying the film roll index screen, display of the film roll index screen shown in FIG. 2C is started in response to the predetermined operation.

Figure 5A:
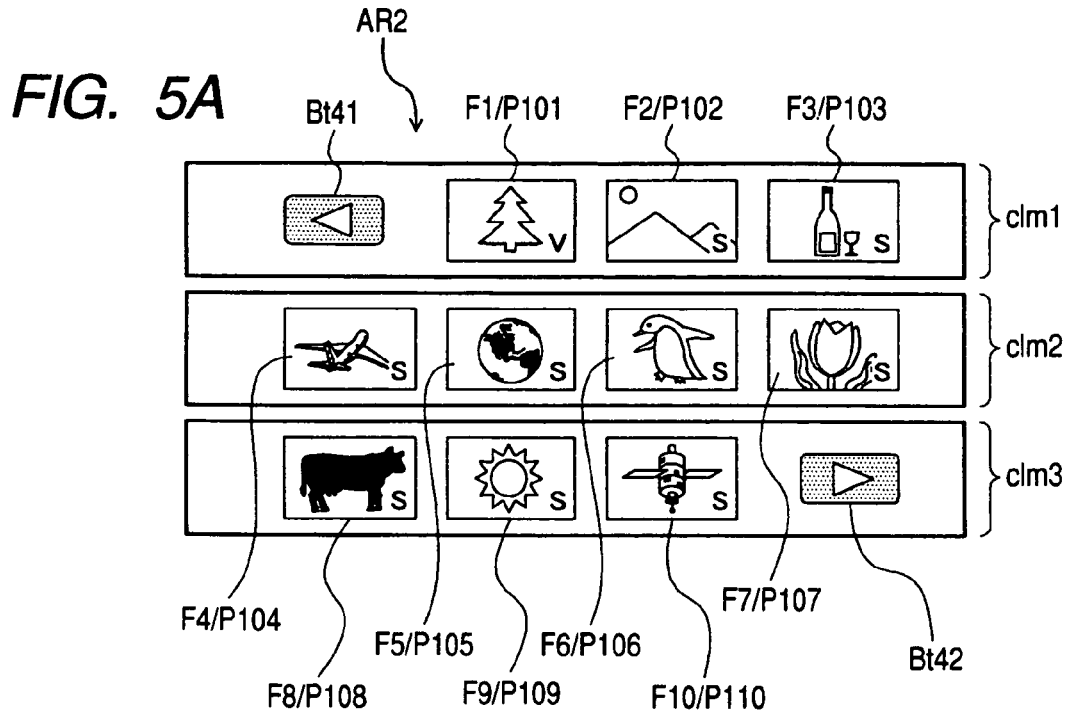
FIGS. 5A and 5B are diagrams showing an example of forms concerning reproduction of an index moving image in the embodiment.
Figure 5B:
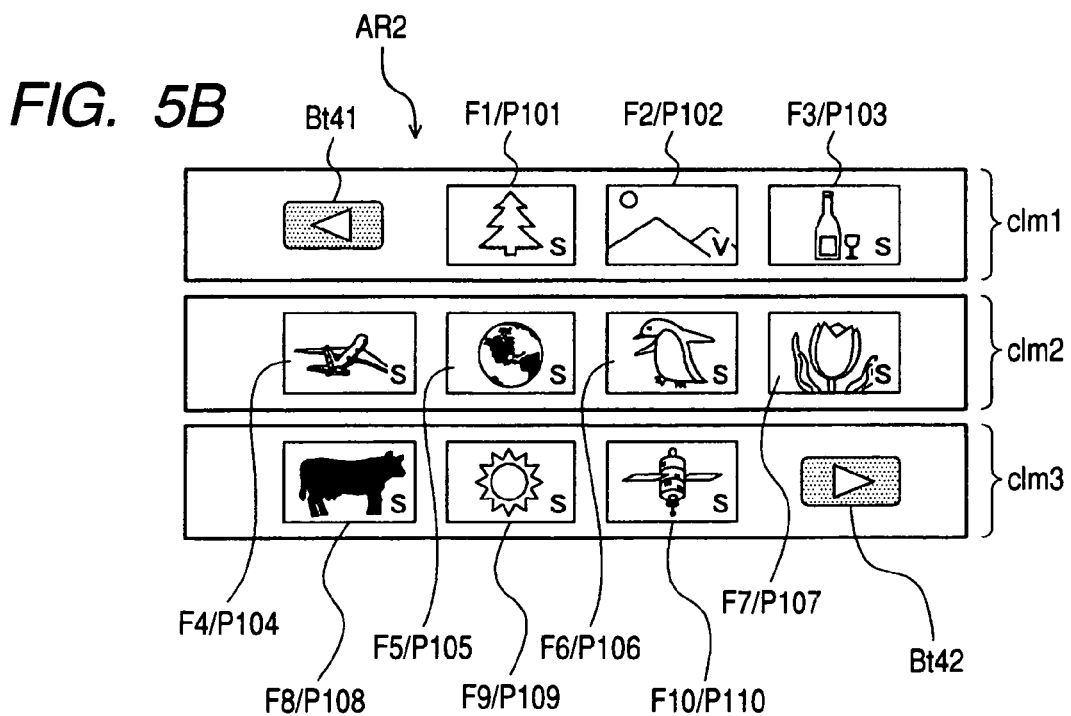

An example of a display form of the in-scene index area AR2 in the film roll index screen at the time of this display start is as shown in FIG. 5A. In the in-scene index area AR2 in this case, as described above, the in-scene index images P101 to P110 are attached to and displayed in the first to tenth index image attaching areas F1 to F10, respectively. Among the in-scene index images, concerning the in-scene index image P101 arranged in the first index image attaching area F1, an image reproduced as a moving image (an index moving image) from a leading position (which coincides with reproduction start time of a video stream) of the in-scene divided section Is1 (see FIG. 4A) represented by the in-scene index image P101 is displayed. In this case, concerning the in-scene index images P102 to P110 attached to and displayed in the remaining second to tenth index image attaching areas F2 to F10, still images (index still images) extracted as explained with reference to FIG. 4B are displayed, respectively. In FIGS. 5A and 5B (and FIGS. 6A and 6B referred to later), "V" displayed on the lower right in the first to tenth index image attaching areas F1 to F10 expediently indicates that an index moving image is displayed there. "S" expediently indicates that an index still image is displayed there. This does not mean that these characters are displayed in practice.

As described above, reproduction of a moving image as the in-scene index image P101 is performed simultaneously with the start of display of the film roll index screen. As shown as a moving image reproduction sequence in FIG. 4C, this moving image reproduction is finished at a point when predetermined reproduction time Tp set in advance elapses. Reproduction time length of the in-scene divided sections corresponding to the respective in-scene index images is extraction time interval Tm. As in the case of this figure, when a relation Tp<Tm holds, the moving image reproduction is stopped at a point when the reproduction time Tp elapses. Reproduction for the remaining portion in the in-scene divided section is not performed. Although not shown in the figure, when a relation Tp≧Tm holds, the moving image reproduction for the in-scene divided section is performed to the end and finished.

When the moving image reproduction for the in-scene index image P101 is finished as described above, as shown in FIG. 5B, first, the in-scene index image P101 is transitioned to display of a still image. As the still image displayed at this point, an image obtained by extraction from the top of the in-scene divided section Is1 is used. It is also conceivable to display a last image subjected to the moving image reproduction as a still image of the in-scene index image P101. The former image or the latter image displayed as a still image after the moving image reproduction in the in-scene index image only has to be arbitrarily selected according to, for example, actual convenience of use or convenience of a display control algorithm.

At the same time, the in-scene index image P102 following the in-scene index image P101 in time series is switched from a still image displayed so far to a reproduced moving image in the in-scene divided section Is2 corresponding thereto. This moving image reproduction is also started from the top of the in-scene divided section Is2.

The reproduction time Tp elapses in the moving image reproduction of the in-scene index image P102, the in-scene index image P102 returns to the sill image display. At the same time, the in-scene index image P103 is switched to a reproduced moving image in the in-scene divided section Is3. The moving image reproduction in the in-scene divided section Is3 is performed for the reproduction time Tp from a start position thereof.

After this, in the same manner, an in-scene index image, for which display of a reproduced moving image for the reproduction time Tp is finished, is returned to an original still image, at the same time, an in-scene index image following the in-scene index image in time series is switched from a still image to a reproduced moving image from the top in an in-scene divided section corresponding thereto to a position where the reproduction time Tp elapses. Such transition of display is sequentially performed according to time series of the in-scene index images.

As described above, in this embodiment, simultaneously with the display start of the film roll index screen, for the in-scene index images representing the in-scene divided sections, moving images in the in-scene divided sections are displayed for the predetermined time (Tp) in order according to time series.

When such display is performed, first, partial moving image content in each of the in-scene divided sections is sequentially displayed according to time series of the selected scene. Consequently, the user can not only easily grasp contents in each of the in-scene divided sections but also grasp a rough flow of contents of the entire selected scene. In the case of this embodiment, according to the display of the film roll index screen, moving image display of the in-scene index images is automatically switched according to time series of the selected scene. Therefore, for example, operation for selecting an in-scene index image to be displayed as a moving image, operation for starting moving image reproduction of the in-scene index image, and the like are unnecessary. The form in which moving image display of the in-scene index image is automatically switched is enjoyable to look at and leads to improvement of amusement.

For confirmation, in JP-A-2006-165679, the technique for reproducing thumbnail images in index list display of scenes (moving image) or chapters is disclosed. A change of a thumbnail image reproduced as a moving image is not automatically performed but is performed according user operation. JP-A-2006-165679 is different from this embodiment in this regard. Skip reproduction of a moving image in JP-A-2006-165679 is performed in moving image reproduction of one thumbnail image. This is different from the form in this embodiment for changing the in-scene index image reproduced as a moving image while reproducing the in-scene index image for the reproduction time Tp.

As explained with reference to FIGS. 5A and 5B, according to the switching of the in-scene index image displayed as a moving image, as shown in FIG. 6A, the in-scene index image P110 displayed in the last index image attaching area F10 is finally displayed as a moving image. In a selected scene in this case, when there is an in-scene index image (an in-scene divided section) following the in-scene index image P110, display is performed as explained below.

As explained above, by operating the forward button Bt41 and the return button Bt42 in the index area AR2, it is possible to scroll the in-scene index images attached to and displayed in the index image attaching areas F1 to F10 in the forward direction and the return direction according to scene reproduction time. This means that display control for scrolling the in-scene index images attached to and displayed in the index image attaching areas F1 to F10 is possible.

Figure 7:
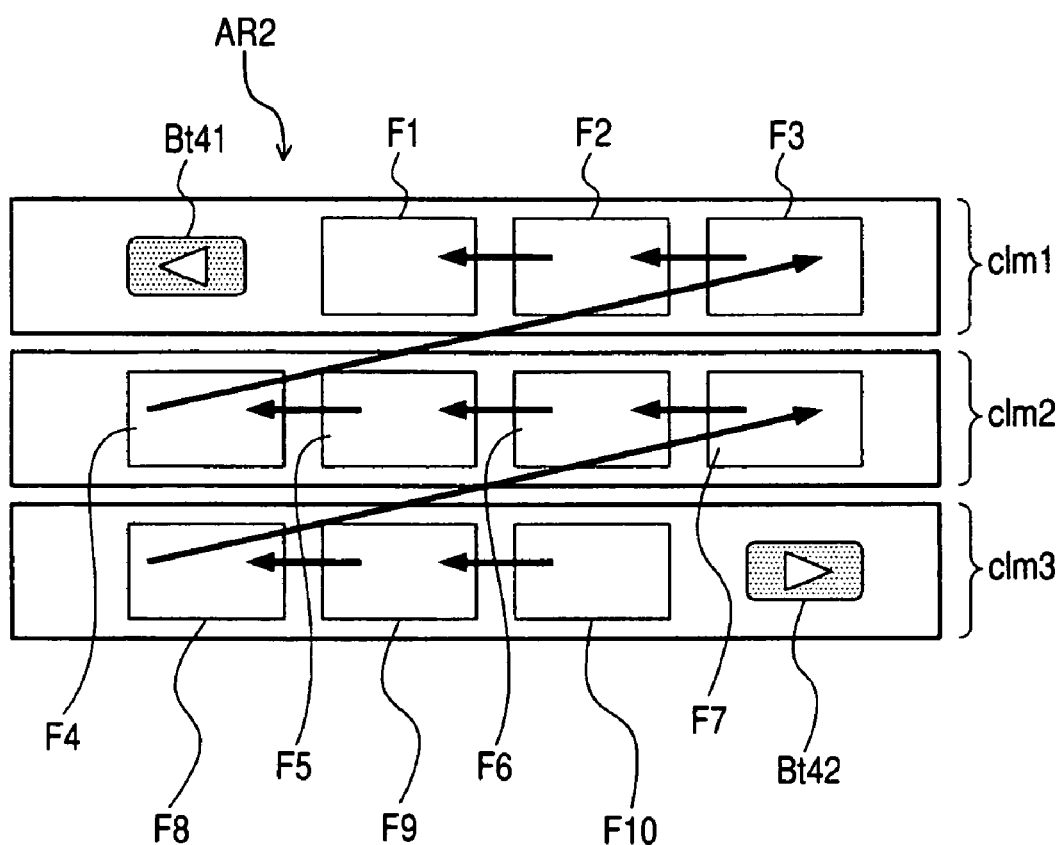
FIG. 7 is a diagram schematically showing a transition state of display contents corresponding to scroll in a forward direction concerning an index image in a scene.

As the scroll for the in-scene index images, a display form of the scroll corresponding to the forward direction (the direction in which the scene reproduction time is put forward) is as shown in FIG. 7. In other words, the in-scene index images displayed in the index image attaching areas F2 to F10 so far are moved and arranged to be displayed in the in-scene index image attaching areas F1 to F9. The in-scene index image displayed in the index image attaching area F1 is deleted. In the index image attaching area F10, an in-scene index image following the in-scene index image moved to and arranged in the index image attaching area F9 in time series is displayed anew. In the scroll in the return direction, the in-scene index images are moved to and arranged in a direction opposite to that in the scroll in the forward direction, the index image displayed in the index image attaching area F10 is deleted, and an in-scene index image immediately preceding the in-scene index image moved to and arranged in the index image attaching area F2 in time series is displayed in the index image attaching area F1 anew.

Then, for example, in a state shown in FIG. 6A, at timing immediately after the reproduction time Tp elapses in the moving image reproduction of the in-scene index image P110 and the moving reproduction is finished, scroll display for one in-scene index image is performed in the forward direction. Consequently, as shown in FIG. 6B, the in-scene index images P102 to P110 formed by still images are moved to and arranged in the index image attaching areas F1 to F9 anew, respectively. At the same time, an in-scene index image P111 immediately following the in-scene index image P110 in terms of reproduction time of the scene is arranged and displayed in the index image attaching area F10 anew. Concerning the in-scene index image P111, a reproduced moving image in an in-scene divided section corresponding thereto is displayed. In the moving reproduction in the in-scene divided section, a section up to a point when the reproduction time Tp elapses from a start position thereof is reproduced.

For example, when the moving image reproduction of the in-scene index image P111 is finished, in the same manner as described above, scroll in the forward direction of in-scene index images as still images is performed in the index image attaching areas F1 to F9. At the same time, moving image reproduction in an in-scene divided section corresponding to an in-scene index image P112 is performed in the index image attaching area F10.

After the in-scene index image is reproduced as a moving image in the last index image attaching area F10 in this way, every time moving image reproduction for the reproduction time Tp is finished, while scroll of in-scene index images (still image) in the forward direction is performed, an in-scene index image corresponding to the next in-scene divided section arranged anew is displayed as a moving image in the index image attaching area F10. In other words, as moving image reproduction, images in the in-scene divided sections are sequentially displayed in the last index image attaching area F10.

For example, when an index moving image corresponding to the last in-scene divided section forming the selected scene is finished, the index moving image is switched to a still image. Consequently, the moving image reproduction sequence for the in-scene index images is finished. After this, for example, in a state in which the respective in-scene index images are sill images, the display of the film roll index screen performed so far is continued.

As a display form of the film roll index screen (the in-scene index area AR2) after the moving image reproduction sequence for the in-scene index images is performed once and finished, several other display forms are conceivable. For example, the moving image reproduction is returned to the display content of the in-scene index area AR2 same as the initial display and the moving image reproduction from the top in-scene index image (P101) is repeated. The moving image reproduction is shifted to a moving reproduction sequence of in-scene index images of another selected scene. In this case, a scene set as the next selected scene only has to be determined according to order such as reproduction order set in scene units. On the film roll index screen according to this embodiment, the order in scene units is reflected on, for example, display order of scene unit index images in scene unit index areas.

For example, when the moving image reproduction of the in-scene index images explained above is executed, if operation for selecting and determining an arbitrary in-scene index image is performed, moving image reproduction for a selected scene from the top of an in-scene divided section corresponding to the selected and determined in-scene index image is performed in a state in which the film roll index screen is switched to the scene reproduction screen shown in FIG. 2D.

As shown in FIGS. 6A and 6B, the in-scene index images are scrolled one by one according to the finish of reproduction of the index moving image. Instead of this, for example, it is also conceivable to adopt a display form in which, at the next timing after the moving image reproduction of the in-scene index image P110 in the index image attaching area F10 shown in FIG. 5B is finished, the in-scene index image P111 that should be reproduced as a moving image next is arranged in the index image attaching area F1, in-scene index images P112 to P120 following the in-scene index image P111 in time series are arranged in the index image attaching areas F2 to F10, and reproduction of index moving images is sequentially performed from this state in the same manner as shown in FIGS. 5A and 5B.

Figure 8A:
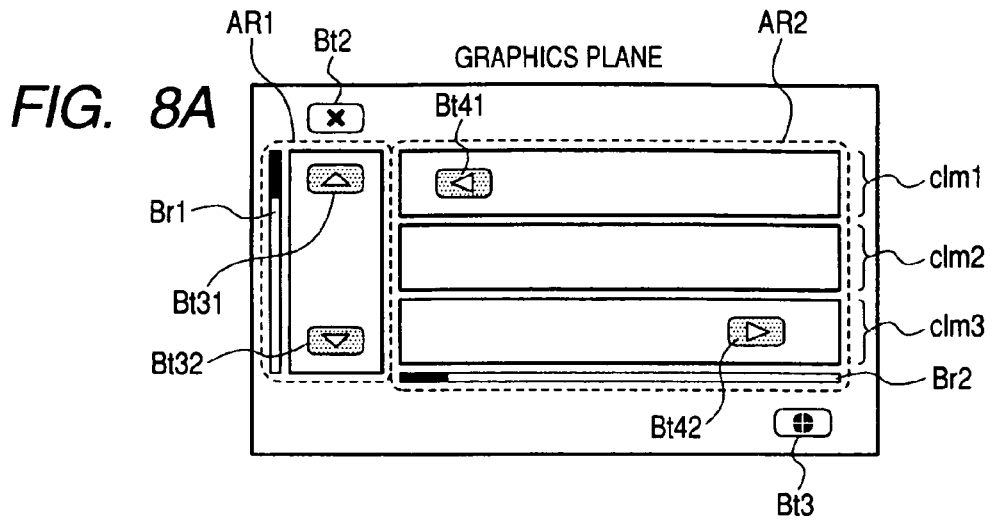
FIGS. 8A to 8C are diagrams schematically showing an example of generation (a display control example) of display image data of a film roll index screen on which an index moving image is displayed.
Figure 8B:
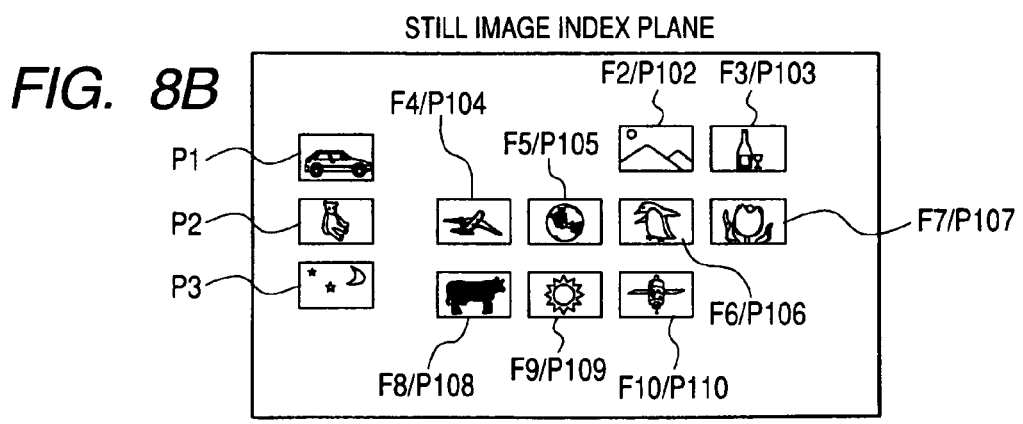
Figure 8C:
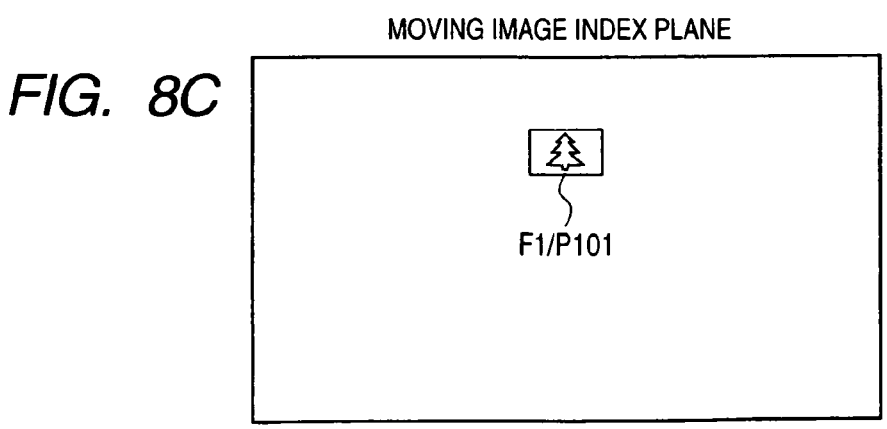

Display image data for realizing the display of the film roll index screen including the moving image reproduction of the in-scene index images explained above can be generated by, for example, generating plane image data as a graphic plane shown in FIG. 8A, a still image index plane shown in FIG. 8B, and a moving image index plane shown in FIG. 8C, respectively, and combining these plane image data to form one image data. Image contents shown in FIGS. 8A to 8C correspond to the image contents of the in-scene index area AR2 shown in FIG. 5A. In FIGS. 8A to 8C, sections identical with those shown in FIGS. 3 and 5A are denoted by the identical reference signs.

The graphics plane shown in FIG. 8A is a plane image other than an in-scene index image. The plane image is obtained by rendering image sections necessary for forming the film roll index screen such as various buttons (the close button Bt2, the related function button Bt3, the forward button Bt31, the return button Bt32, the forward button Bt41, and the return button Bt42), the scroll bars Br1 and Br2, a frame indicating a display area of a scene unit index image, and a frame indicating the row areas clm1, clm2, and clm3 of the in-scene index area AR2.

The still image index plane shown in FIG. 8B is a plane image formed by rendering in-scene index images that should be displayed as still images among the in-scene index images that should be attached to and displayed in the index image attaching areas F1 to F10. Plane image contents shown in FIGS. 8A to 8C correspond to FIG. 5A as described above. Therefore, the still image index plane shown in FIG. 8B is formed by rendering the scene unit index images P1, P2, and P3 as still images arranged in the scene unit index area AR1 and the in-scene index images P102 to P110 as still images arranged in positions in the index image attaching areas F2 to F10.

The moving image index plane shown in FIG. 8C is a plane image formed by rendering an in-scene index image that should be displayed as a moving image among the in-scene index images that should be attached to and displayed in the index image attaching areas F1 to F10. By associating FIG. 8C with FIG. 5A, a state in which the in-scene index image P101 as a moving image arranged in a position in the index image attaching area F1 is rendered and the moving index plane is formed is shown.

If the data of the plane images shown in FIGS. 8A to 8C are combined to form one display image data, image contents as the film roll index screen shown in FIG. 5A are obtained.

Processing performed by operating the related function button Bt3 in the film roll index screen according to this embodiment is explained below.

As described above, the related function button Bt3 is prepared to immediately shift to screens (e.g., a menu screen) for other functional operations corresponding and related to an operation screen or the like displayed at that point. A screen to which the film roll index screen is shifted is different depending on contents of the operation screen.

Figure 9:
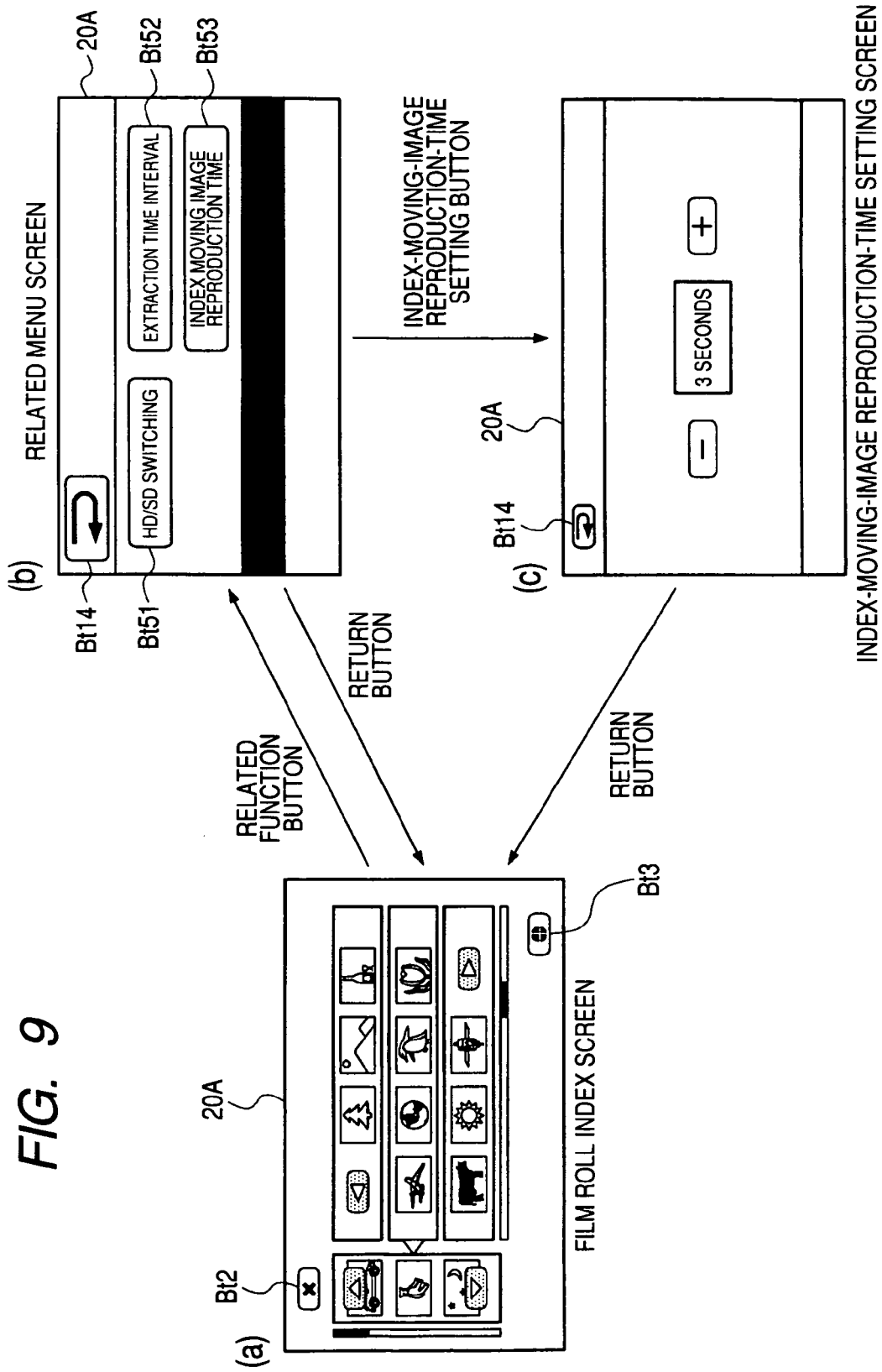
FIGS. 9A to 9C are diagrams showing an example of transition between a related menu screen and an index-moving-image reproduction-time setting screen with the film roll index screen set as an origin.

When touch panel push operation on the related function button Bt3 arranged in the film roll index screen is performed, for example, as indicated as transition from FIG. 9A to FIG. 9B, the display screen section 20A is shifted to a related menu screen corresponding to the film roll index screen.

In the related menu screen shown in FIG. 9B, an HD/SD switching button Bt51, an extraction time interval setting button Bt52, an index moving image reproduction time setting button Bt53, and the return button Bt14 are arranged and displayed. When the return button Bt14 is operated, the display screen section 20A is returned to the film roll index screen shown in FIG. 9A in a state before the related menu screen is displayed.

The HD/SD switching button Bt51 is a button for shifting the display screen section 20A to an operation screen for switching a video signal format recorded and reproduced by the video camera apparatus 1 between HD (High Definition) and SD (Standard Definition).

When touch panel push operation on the extraction time interval setting button Bt52 is performed, although not shown in the figure, the display screen section 20A shifts to an extraction time interval setting screen. In a state in which the extraction time interval setting screen is displayed, the user can perform setting for changing the extraction time interval Tm explained with reference to FIGS. 4A to 4C by performing predetermined operation (touch panel push operation) on the extraction time interval setting screen.

When touch panel push operation on the index moving image reproduction time setting button Bt53 is performed, the display screen section 20A shifts to the index moving image reproduction time setting screen shown in FIG. 9C. A change in the reproduction time Tp shown in FIG. 4C, i.e., moving image reproduction time in an in-scene divided section for each of the in-scene index images can be set by operation on the index moving image reproduction time setting screen.

Figure 10:
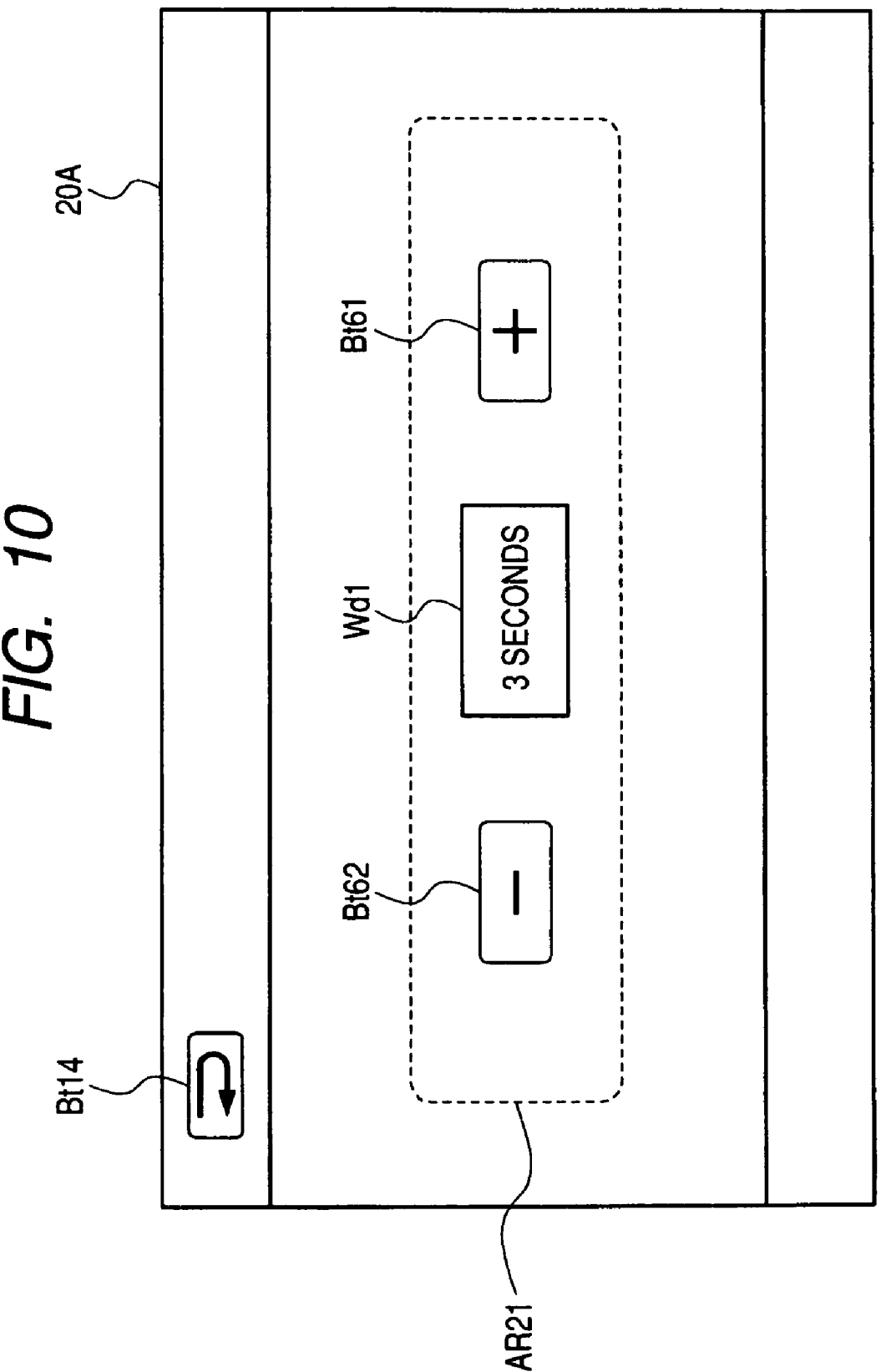
FIG. 10 is a diagram showing an example of a display form of the index-moving-image reproduction-time setting screen.

In the index moving image reproduction time setting screen, as shown in FIG. 10, a plus button Bt61, a minus button Bt62, and a set time display window wd1 are arranged and displayed. The user appropriately operates the plus button Bt61 and the minus button Bt62 to increase and decrease a numerical value indicating the reproduction time Tp displayed in the set time display window wd1 and sets time length as the reproduction time Tp desired by the user. When the reproduction time Tp is set rather short, an in-scene index image reproduced as a moving image is switched at quick timing. Therefore, for example, it is possible to grasp contents of an entire scene in a short time. On the other hand, when the reproduction time Tp is set rather long, contents of respective in-scene divided sections can be seen for a long time. This is advantageous when the user desires to check contents of a scene carefully. In this embodiment, the user can change the setting of the reproduction time Tp. However, for example, the reproduction time Tp assumed to be optimum in general may be fixedly set.

When touch panel push operation on the return button Bt14 in the time interval setting screen is performed, as indicated as transition from FIG. 5C to FIG. 5A, the display screen section 20A shifts to the film roll index screen. In other words, in this case, since the time interval setting screen is a hierarchical menu screen of the related menu screen, the display screen section 20A returns to the state before display of the related menu screen.

Subsequently, an example of a technical configuration for realizing the display of the film roll index screen including the moving image reproduction sequence of the in-scene index images explained above is explained.

The scene unit index images or the in-scene index images displayed on the film roll index screen are generated on the basis of data of video contents equivalent to scene units stored and managed in the HDD 16.

First, an example of a management form for the video contents stored in the HDD 16 by the video camera apparatus 1 according to this embodiment is explained with reference to FIG. 11.

Figure 11:
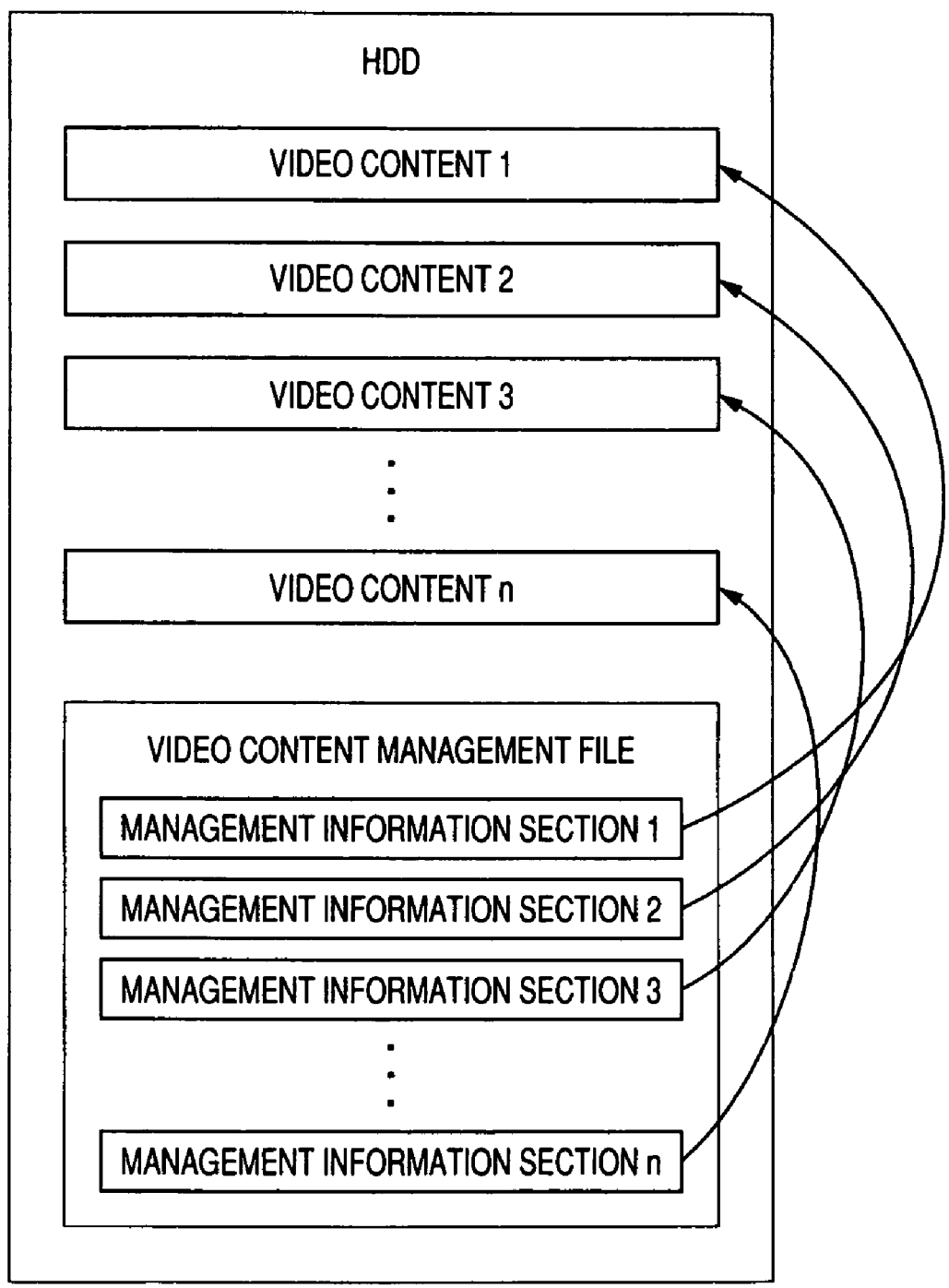
FIG. 11 is a diagram for explaining an example of a form of management of video contents in the embodiment.

In FIG. 11, an example of stored contents in the HDD 16 is schematically shown. In this case, n video contents 1 to n, which are unit moving image data (moving image files) corresponding to scene units, are stored in the HDD 16. Usually, one scene corresponds to one moving image file. However, when time of one scene exceeds fixed time, the scene is divided into plural moving image files and managed on a file system. These divided moving image files are treated as one scene by an application for video content management higher in order than the file system. A video content management file is also stored in the HDD 16 together with data of the video contents.

Figure 12:
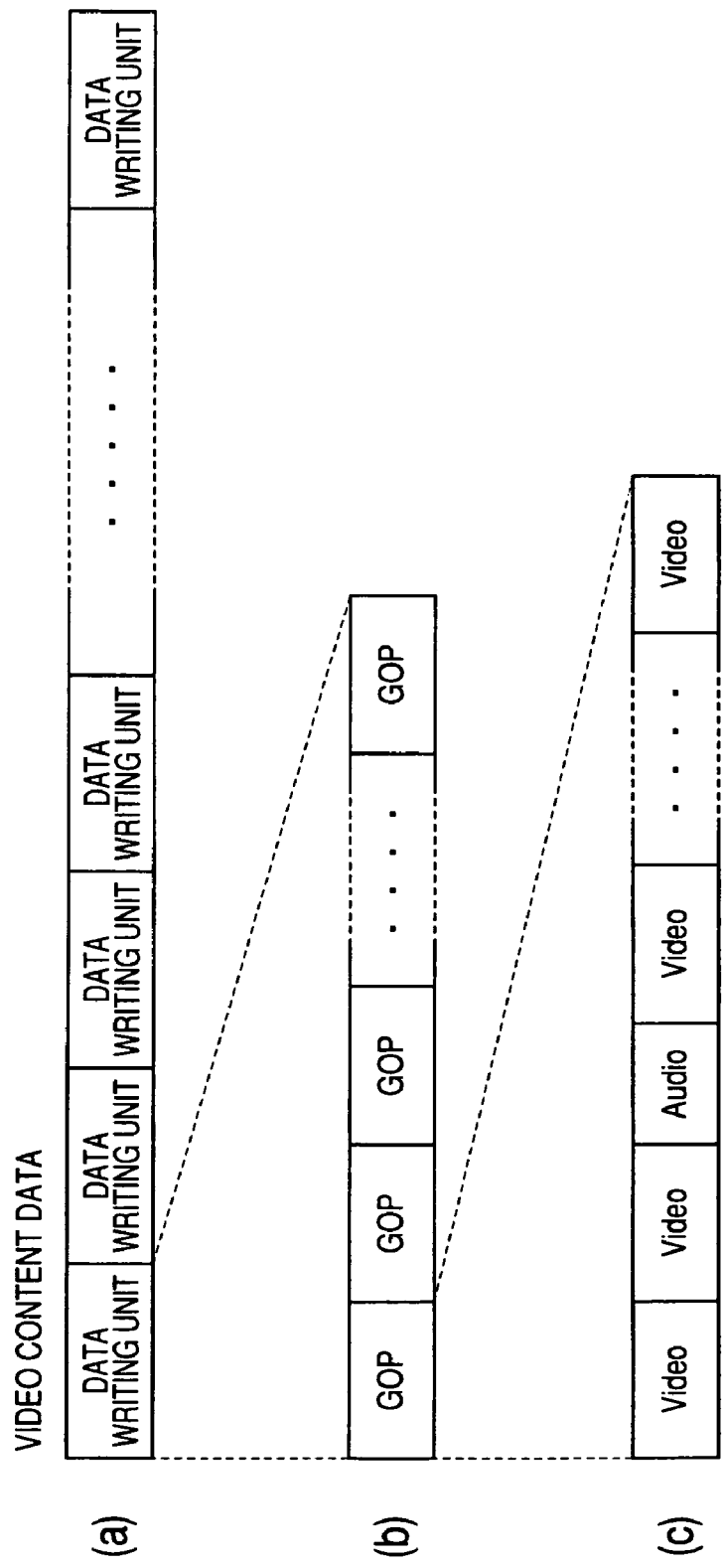
FIGS. 12A to 12C are diagrams for explaining an example of the structure of the video contents in the embodiment.

An example of the structure of data of video contents (video content data) corresponding to one moving image file is shown in FIGS. 12A to 12C.

In FIG. 12A, video content data is indicated by a sequence of data writing units according to time series. For example, in the video camera apparatus 1, when data of video contents data is written and recorded in the HDD 16 serving as a recording medium, recording data of the video contents is generated by the recording and reproduction processing circuit 15 and temporarily accumulated in a buffer. A set of the recording data of a certain large size accumulated in the buffer is read out at a time and written in the HDD 16 at predetermined timing. The data accumulated in the buffer and written at a time corresponds to a unit of data writing. The unit of data writing is substantially fixed.

In this case, the unit of data writing is formed by a sequence of GOPs (Group Of Pictures) as shown in FIG. 12B. As it is well known, the GOP is one reproduction unit (compression and expansion processing unit) obtained by image compression and encoding processing. It is possible to independently perform demodulation processing in the GOP itself and normally reproduce a moving image for certain time. As it is also well known, at least one I (Intra) picture is included in the GOP. For confirmation, the I picture is not an image created by predictive encoding unlike other P (Predictive) picture and B (Bi-directional Predictive) picture but is image data generated from one independent frame image.

As the structure in the GOP in this case, as shown in FIG. 9C, the GOP includes video data and audio data divided in predetermined units.

The video content management file shown in FIG. 11 is a file necessary for managing reproduction of video contents stored in the same HDD 16 (usually, "reproduction" generally refers to irregular reproduction such as fast forward and fast return, play list reproduction, and the like). For example, as contents of the video content management file, as shown in the figure, the video content management file has management information sections 1 to n corresponding to video contents 1 to n stored in the HDD 16. For example, when reproduction management for the video content 1 is performed, the management information section 1 in the video content management file is used.

In practice, as a standard and a format for individually providing a file for video content management like the video content management file separately from a file of video content, there are AVCHD and the like. In recording in a standard signal format (an SD format) in a DVD-Video, DVD+VR, and DVD−VR other than the HDD, such a file for video content management is recorded.

Figure 13:
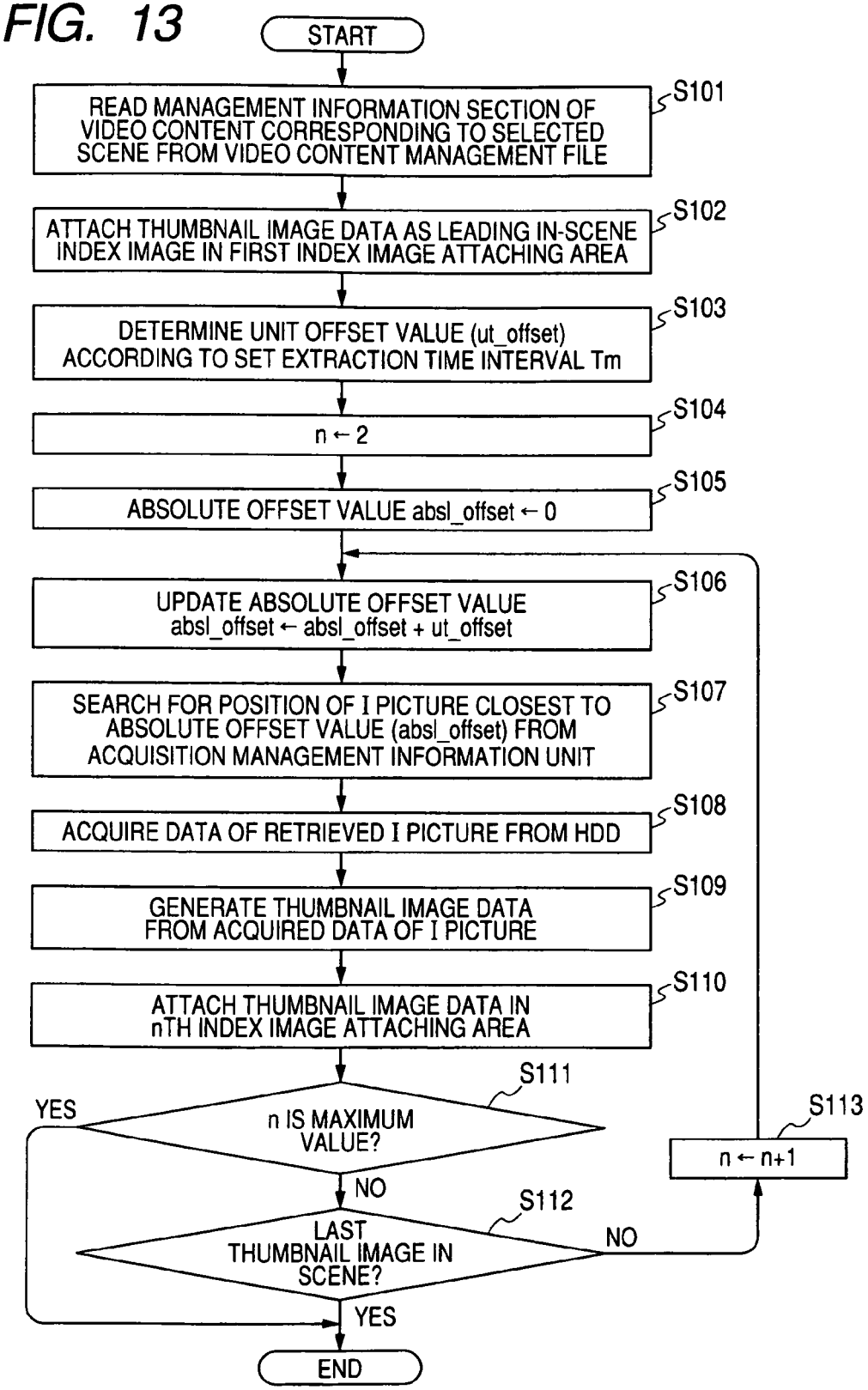
FIG. 13 is a flowchart showing an example of a processing procedure for initial display concerning an index area in a scene.
Figure 14:
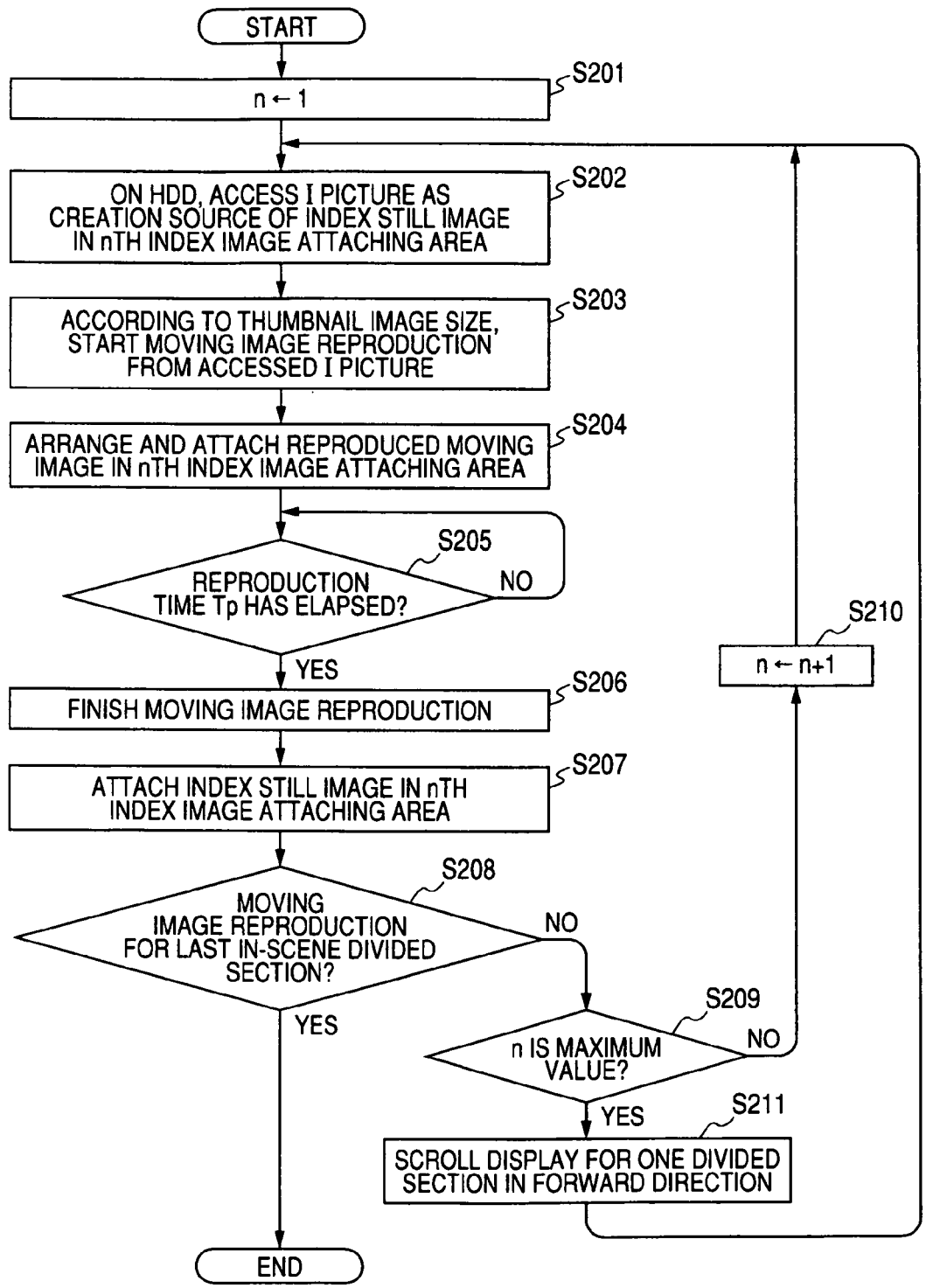
FIG. 14 is a flowchart showing an example of a processing procedure for index moving image display in the index area in a scene.

Flowcharts of FIGS. 13 and 14 show example of a processing procedure concerning display control for the in-scene index area AR2 in the film roll index screen executed by the video camera apparatus 1 according to this embodiment.

As described above, the basis of display of an in-scene index image in the in-scene index area AR2 is display of a still image. It can be considered that the moving image reproduction sequence explained with reference to FIGS. 5 and 6 is performed on the basis of the display of a still image.

First, a processing procedure for forming image contents as the basic in-scene index area AR2 is explained with reference to the flowchart of FIG. 13. This is a procedure for extracting in-scene index images as still images and attaching the in-scene index images in the index image attaching areas F1 to F10. Then, an example of a procedure of display control that can give a moving image reproduction sequence for the in-scene index images to the in-scene index area AR2 formed by the procedure of FIG. 13 is explained with reference to the flowchart of FIG. 14.

At the start of display of the film roll index screen, first, the in-scene index area AR2 in which the in-scene index images, all of which are still images, are displayed is formed by the procedure indicated by the flowchart of FIG. 13. Immediately after that, the procedure shifts to the procedure of the moving image reproduction sequence shown in FIG. 14. For example, in practice, even if display control is performed according to this procedure, time during which all the in-scene index images are displayed as still images is an instant for the user. Therefore, it seems that, for example, the in-scene index image in the index image attaching area F1 is reproduced as a moving image simultaneously with the start of display of the film roll index screen.

According to the above explanation, the processing procedure shown in FIG. 13 can be regarded as processing for generating a still image index plane. The processing procedure shown in FIG. 14 can be regarded as processing for generating a still image index plane and a moving image index plane according to the progress of the moving image reproduction sequence.

The processing shown in FIGS. 13 and 14 can be regarded as being realized by, for example, a CPU executing a program stored in a ROM, a nonvolatile memory, or the like in the microprocessor 17. Other than, for example, writing and storing the program in the ROM or the like as described above, it is conceivable to store the program in a removable storage medium and, then, install (including update) the program from the storage medium and store the program in a nonvolatile storage area in the microprocessor 17. It is also conceivable to install the program according to control from another host apparatus through a data interface such as a USB or IEEE 1394. Moreover, it is also conceivable to store the program in a storage device in a server on a network and, then, give a network function to the video camera apparatus 1 to make it possible to download and acquire the program from the server or the like.

For example, when operation for shifting display from another screen to the film roll index screen or operation for changing a selected scene in the scene unit index area AR1 in a state in which the film roll index screen is displayed is performed, display contents of the in-scene index area AR2 should be changed according to the change of the selected scene. Then, the microprocessor 17 executes a processing procedure starting from step S101 in FIG. 13.

First, in step S101, the microprocessor 17 reads and acquires a management information section corresponding to video contents corresponding to a present selected scene from the video content management file stored in the HDD 16.

The management information section of the video content management file includes various management information items concerning the video contents corresponding to the management information section. As it is understood from the following explanation, management information items used in the processing shown in FIG. 10 among these management information items are size information indicating a data size in GOP units, reproduction time information for video data (stream), and the like.

In the following explanation, the management information read and acquired in step S101 is referred to as "acquired management information section".

In the subsequent step S102, first, the microprocessor 17 acquires thumbnail image data having image contents at the top of the present selected scene and converts the thumbnail image data into a thumbnail image and attaches the thumbnail image to a position corresponding to the index image attaching area F1, which is a first index image attaching area in arraying order in time series, on the still image index plane. The image attached in this way is equivalent to the in-scene index image P101 indicating image contents at the top of the scene in the relation with FIG. 3, FIGS. 4A to 4C, and the like.

In obtaining the thumbnail image as the in-scene index image at the top of the scene, in this embodiment, thumbnail image data as a basis of the scene unit index image P2 of the selected scene displayed in the scene unit index area AR1 only has to be diverted. This is because, in the video camera apparatus 1 according to this embodiment, the scene unit index image is obtained by converting the image contents at the top of the scene into a thumbnail image. If the thumbnail image data of the in-scene index image at the top is acquired in this way, it is unnecessary to directly access an I picture corresponding to, for example, video content data in the HDD 16 from the video content data and read the I picture. Therefore, it is possible to reduce a processing load. It goes without saying that frame image data (e.g., an I picture) corresponding to the top of video contents corresponding to the selected scene may be read out from the HDD 16 and a scene unit index image may be created on the basis of the image data. In this case, for example, an image data position at the top of the video contents stored in the HDD 16 can be recognized by referring to contents of the acquired management information section read and acquired in step S101.

In step S103, the microprocessor 17 determines a unit offset value (ut_offset) according to the extraction time interval Tm set at this point. As it is understood from the following explanation, the unit offset value (ut_offset) is a value used for retrieving the I picture as a base of the in-scene index image. For example, if the unit offset value (ut_offset) is also represented as a time value, the unit offset value indicates a value that coincides with time length indicated by the extraction time interval Tm.

In step S104, the microprocessor 17 substitutes (sets) 2 in a variable "n". The variable "n" indicates an index image attaching area for attaching the thumbnail image data extracted as the in-scene index image. In other words, any one of the first to tenth index image attaching areas F1 to F10 is specified by the variable "n". If the variable "n" is 2, the variable "n" indicates the second index image attaching area F2. The initial value of the variable "n" is set to 2 because the attachment of the thumbnail image data to the first index image attaching area F1 corresponding to the variable "n"=1 has already been completed in step S102.

In step S105, the microprocessor 17 sets 0 as an initial value of an absolute offset value (absl_offset). The absolute offset value (absl_offset) indicates an offset value of reproduction time starting from reproduction start time (time of day) of video contents corresponding to the selected scene. absl_offset=0 indicates reproduction start time of the video contents.

A procedure executed in step S106 and subsequent steps after the initial setting is performed is a procedure for extracting in-scene index images corresponding to the index image attaching areas F2 to F10 and attaching thumbnail image data of the in-scene index images.

First, in step S106, the microprocessor 17 updates and sets the absolute offset value (absl_offset). An updated value of the absolute offset value (absl_offset) is calculated by a calculation represented by the following expression:

$$absl\_offset \rightarrow absl\_offset + ut\_offset \quad (1)$$

In other words, the updated value is obtained by adding the unit offset value (ut_offset) acquired in step S103 to the absolute offset value (absl_offset) set so far.

In step S107, the microprocessor 17 retrieves, referring to the acquired management information section, an I picture present in a closest time position before and after reproduction time of the video contents indicated by the absolute offset value (absl_offset) updated in step S106. A position of the I picture as a result of the retrieval in this case is represented by, for example, the reproduction time in the video contents. The I picture retrieved in step S107 is a base of thumbnail image data that should be attached to and displayed in a position corresponding to an nth index image attaching area Fn on the sill image index plane as a scene unit index image formed by a still image.

In step S108, the microprocessor 17 accesses a data position corresponding to a reproduction time position of the I picture retrieved in step S107 in stream data of the video contents of the selected scene recorded in the HDD 16. Consequently, access to actual data of the retrieved I picture is performed. The microprocessor 17 reads out and acquires the accessed data of the I picture.

In step S109, the microprocessor 17 generates, from the data of the I picture acquired in step S108, thumbnail image data having an image size matching a display size of the in-scene index image. In step S110, the microprocessor 17 attaches the thumbnail image data generated in step S109 to a position corresponding to the nth index image attaching area Fn on the still image index plane.

In step S111, the microprocessor 17 judges whether the variable "n" has reached a maximum value. In the case of the display form shown in FIG. 3, the maximum value of the variable "n" is 10. When an affirmative judgment result is obtained, the thumbnail image data is attached to all the index image attaching areas. Therefore, in this case, the microprocessor 17 leaves the processing procedure in steps S106 to S113, which is loop processing for attaching the in-scene index images to the second index image attaching area F2 and subsequent index image attaching areas, and the processing shown in the figure is finished.

On the other hand, when a negative judgment result is obtained in step S111, the microprocessor 17 proceeds to step S112.

In step S112, the microprocessor 17 judges whether the thumbnail image data attached in the last step S110 is thumbnail image data for an in-scene index image corresponding to a last in-scene divided section in time series in the selected scene.

When a negative judgment result is obtained in step S112, this means that index image attaching areas to which the thumbnail image data is not attached yet remain. Therefore, in this case, in step S113, the microprocessor 17 increments the variable "n" and returns to step S106.

On the other hand, when an affirmative judgment result is obtained in step S112, this means that there is no index image attaching area to which the thumbnail image data is not attached. Therefore, in this case, as in the case in which an affirmative judgment result is obtained in step S111, the microprocessor 17 finishes the processing shown in the figure.

Subsequently, FIG. 14 is explained. In FIG. 14, as described above, for example, a control procedure for moving image reproduction for in-scene index images executed immediately after the display of the film roll index screen is completed as shown in FIG. 13 is shown.

In FIG. 14, first, in step S201, as in the case shown in FIG. 13, 1 is set as an initial value for the variable "n" indicating the index image attaching areas.

In the following step S202, the microprocessor 17 executes control for accessing an I picture that is an original source of creation of an in-scene index image as a still image (an index still image) attached to and displayed in the present nth index image attaching area Fn. For confirmation, the I picture is present in a stream of the video content data stored in the HDD 16 as an I picture corresponding to the selected scene. To access the I picture, for example, the microprocessor 17 only has to store an address of the I picture executed according to step S108 in FIG. 13 as a result of retrieval of the I picture and refer to the stored address. In access to the I picture corresponding to the first in-scene index image (P101) in the selected scene, the microprocessor 17 only has to access the top I picture in the video content data.

Subsequently, in step S203, the microprocessor 17 starts moving image reproduction processing from an image of the I picture accessed in step S202. In this case, instead of reproducing a moving image with resolution inherent in the video content data, the microprocessor 17 performs reproduction processing according to a size and resolution of a thumbnail image (an in-scene index image) corresponding to the index image attaching area. The microprocessor 17 attaches a moving image started to be reproduced in this way to a position corresponding to the present nth index image attaching area Fn on the moving image plane. At the same time, the microprocessor 17 attaches nothing to a position corresponding to the nth index image attaching area Fn on the still image index plane. Consequently, as explained with reference to FIGS. 5A and 5B and FIGS. 6A and 6B, a form in which one in-scene index image among the in-scene index images is displayed as a moving image and the remaining in-scene index images are displayed as still images is obtained.

In step S205, the microprocessor 17 waits for the reproduction time Tp set in advance to elapse in the moving image reproduction started in step S203. At timing when the reproduction time Tp elapses, the microprocessor 17 shifts to procedures in step S206 and subsequent steps.

In step S206, first, the microprocessor 17 finishes the moving image reproduction started from the step S203. At the same time, the thumbnail image data of the moving image arranged on the moving image index plane is also deleted once. Simultaneously with step S206, in step S207, the microprocessor 17 attaches the in-scene index image as a still image to a position corresponding to the nth index image attaching area Fn on the still image index plane.

In step S208, the microprocessor 17 judges whether the present reproduction of the moving image in steps S203 to S206 is reproduction for the last in-scene divided section in the selected scene.

When an affirmative judgment result is obtained, the moving image reproduction for all the in-scene index images in the selected scene has been completed by the processing performed so far. Therefore, the microprocessor 17 leaves the processing shown in the figure. On the other hand, when a negative result is obtained, the microprocessor 17 proceeds to step S209.

In step S209, the microprocessor 17 judges whether the variable "n" set at present indicates the maximum value. When the variable "n" has not reached the maximum value yet and a negative judgment result is obtained, in step S210, the microprocessor 17 increments the variable "n" and, then, returns to the procedure in step S202. When the microprocessor 17 returns to step S202 in this way, for example, as indicated as transition from FIG. 5A to FIG. 5B, the display of the in-scene index image as a moving image is switched to the next index image attaching area in time series.

On the other hand, when the variable "n" has reached the maximum value and an affirmative result is obtained in step S209, in a present state, for example, as shown in FIG. 6A, the moving image is reproduced in the last index image attaching area in time series (the tenth index image attaching area F10) and the reproduction is finished. Therefore, in this case, in step S211, concerning the in-scene index images that should be arranged in the still image index plane, the microprocessor 17 executes display control to perform scroll for one in-scene index image in the forward direction. Consequently, a thumbnail image data (a still image) of an in-scene index image following the in-scene index image attached so far is attached anew to the last index image attaching area (the tenth index image attaching area F10) in time series. In the scroll display, for example, the microprocessor 17 arranges the thumbnail image data, which are arranged in the positions corresponding to the index image attaching areas F2 to F10 so far, in the index image attaching areas F1 to F9, respectively, in the still image index plane. At the same time, the microprocessor 17 generates thumbnail image data as an in-scene index image that should be arranged in the index image attaching area F10 anew and attaches the thumbnail image data to a position of the index image attaching area F10 on the sill image index plane. In generating thumbnail image data of an in-scene index image that should be arranged in the index image attaching area F10, for example, the microprocessor calculates a recording position on the HDD 16 for an I picture, which is a base of the thumbnail image data, and accesses the recording position to read the I picture. The recording position of the I picture can be calculated by adding the unit offset value (ut_offset) to the absolute offset value (absl_offset) of the I picture, which is a base of the thumbnail image data arranged in the immediately preceding index image attaching area F10 in time series, and updating the absolute offset value.

After completing the processing in step S211, the microprocessor 17 returns to step S202. Consequently, the thumbnail image data of the still image is immediately switched to a moving image.

In this way, the microprocessor 17 performs scroll in step S211 and, then, returns to step S202. Alternatively, the microprocessor 17 increments the variable "n" in step S210 and, then, returns to step S202. Consequently, a representative image that should be designated as a moving image next is sequentially changed.

As a form of storage management for video content data and a format and the structure of the video content data, various forms, formats, and structures are conceivable other than those explained with reference to FIGS. 12A to 12C. Therefore, for example, actual processing concerning the access control to the I picture in the processing procedure for display control on the film roll index screen in FIGS. 12A to 12C and 13, the moving image reproduction control in FIG. 13, and the like should be appropriately changed.

In the embodiment of the present invention, as long as the in-scene index area AR2 adopts the form in which in-scene index images extracted from a stream of video contents at predetermined extraction time intervals are arrayed and displayed, a display form and the like in the film roll index screen may be appropriately changed. In the embodiment, the in-scene index images are extracted at equal intervals represented by the set extraction time interval Tm. However, the extraction time intervals may be changed according to predetermined conditions.

In the embodiment of the present invention, the display form in which index images displayed as a moving image are sequentially changed in predetermined order set in advance in a state in which index images (thumbnail images) are arrayed is adopted, moving image data units represented by the index images are not specifically limited. In the embodiment, the moving image data units are in-scene divided sections obtained by dividing one scene. However, the moving image data units may be, for example, scene units. Therefore, a determination rule for order for changing index images displayed as a moving image may be appropriately changed.

In the embodiment, index images are arrayed in arraying order in time series of a scene and order of index images displayed as a moving image should also be set according to time series order of in-scene divided sections (unit moving image data) corresponding to the index images. Therefore, order for changing moving image display is set according to arraying order of the index images. However, a rule of order for changing moving image display (an order rule) is not limited to, for example, a rule based on time series. For example, other rules such as a bit rate for each unit moving image data are conceivable. Moreover, depending on a relation between the order rule for moving image display and the order rule for setting arraying order of index images (representative images), the order for changing moving image display and the arraying order of the index images may be different.

The present invention has a characteristic that sequence reproduction of an index moving image for changing index images displayed as a moving image is automatically performed. In the embodiment, such sequence reproduction of an index moving image is automatically started simultaneously with the start of display of the film roll index screen. However, for example, it is conceivable to perform initial display of the film roll index screen as display by all index still images and make it possible to start (and stop) the sequence reproduction of an index moving image according to user operation.

In the embodiment, the present invention is applied to the video camera apparatus. Besides, it is also possible to apply the present invention to, for example, other electronic apparatuses such as a digital still camera and a cellar phone that have a moving image photographing function.

It should be understood by those skilled in the art that various modifications, combinations, sub-combinations, and alterations may occur depending on design requirements and other factors insofar as they are within the scope of the appended claims or the equivalents thereof.

What is claimed is:

1. A display control apparatus comprising:
    list-image-display control means for executing control for displaying a unit moving image list image formed by arranging at least representative images corresponding to respective unit moving image data in a predetermined unit;
    representative-image-display control means for arranging, concerning representative images that should be designated as moving images among the representative images, a moving image obtained by reproducing unit moving image data corresponding thereto on the unit moving image list screen and arranging, concerning the representative images other than the representative images designated as the moving image, a still image represented by a unit moving image corresponding thereto on the unit moving image list image; and
    moving-image-change control means for sequentially changing the representative images designated as a moving image in accordance with a predetermined change rule and change timing such that a respective image is designated as a respective moving image at a first timing and is designated as a still image at a second timing which is different from the first timing.

2. The display control apparatus according to claim 1, wherein the moving-image-change control means changes the representative image, which should be designated as the moving image, according to timing when reproduction of the unit moving image data in predetermined time length is completed.

3. The display control apparatus according to claim 1, wherein the moving-image-change control means changes the representative image, which should be designated as the moving image, in association with order of the unit moving image data determined according to a predetermined order rule.

4. The display control apparatus according to claim 3, wherein
    the unit moving image data is partial moving image data obtained by dividing moving image data that forms one scene, and
    the moving-image-change control means changes the representative image, which should be designated as the moving image, in association with order determined according to the order rule in time series of the unit moving image data in the scene.

5. The display control apparatus according to claim 1, wherein the representative-image-display control means changes, when a change destination representative image that should be designated as a moving image next by the moving-image-change control means is not already arranged on the unit moving image list image, an arrangement of the representative image on the unit moving image list image to a predetermined form to arrange the change destination representative image as the moving image on the unit moving image list image anew.

6. A display control method comprising the steps of:
    executing control for displaying a unit moving image list image formed by arranging at least representative images corresponding to respective unit moving image data in a predetermined unit;
    arranging, concerning representative images that should be designated as moving images among the representative images, a moving image obtained by reproducing unit moving image data corresponding thereto on the unit moving image list screen and arranging, concerning the representative images other than the representative images designated as the moving image, a still image represented by a unit moving image corresponding thereto on the unit moving image list image; and sequentially changing the representative images designated as a moving image in accordance with a predetermined change rule and change timing such that a respective image is designated as a respective moving image at a first timing and is designated as a still image at a second timing which is different from the first timing.

7. A non-transitory computer readable medium having stored thereon a computer program comprising a set of instructions which when executed by a computer implement a method for controlling a display, the method comprising the steps of:

executing control for displaying a unit moving image list image formed by arranging at least representative images corresponding to respective unit moving image data in a predetermined unit;

arranging, concerning representative images that should be designated as moving images among the representative images, a moving image obtained by reproducing unit moving image data corresponding thereto on the unit moving image list screen and arranging, concerning the representative images other than the representative images designated as the moving image, a still image represented by a unit moving image corresponding thereto on the unit moving image list image; and sequentially changing the representative images designated as a moving image in accordance with a predetermined change rule and change timing such that a respective image is designated as a respective moving image at a first timing and is designated as a still image at a second timing which is different from the first timing.

8. A display control apparatus comprising:

a list-image-display control unit executing control for displaying a unit moving image list image formed by arranging at least representative images corresponding to respective unit moving image data in a predetermined unit;

a representative-image-display control unit arranging, concerning representative images that should be designated as moving images among the representative images, a moving image obtained by reproducing unit moving image data corresponding thereto on the unit moving image list screen and arranging, concerning the representative images other than the representative images designated as the moving image, a still image represented by a unit moving image corresponding thereto on the unit moving image list image; and a moving-image-change control unit sequentially changing the representative images designated as a moving image in accordance with a predetermined change rule and change timing such that a respective image is designated as a respective moving image at a first timing and is designated as a still image at a second timing which is different from the first timing.

* * * * *